US010906437B2

(12) United States Patent
Hunter et al.

(10) Patent No.: US 10,906,437 B2
(45) Date of Patent: Feb. 2, 2021

(54) RV RETROFIT SYSTEM

(71) Applicant: Storyteller Overland, LLC., Birmingham, AL (US)

(72) Inventors: Jeffrey Hunter, Helena, AL (US); Daniel Freyermuth, Highlands Ranch, CO (US); Adam Donaldson, Leeds, AL (US); Mark Isbell, Pell City, AL (US); Brent Lang, Birmingham, AL (US); Dave Slater, Elhart, IN (US)

(73) Assignee: STORYTELLER OVERLAND, LLC., Birmingham, AL (US)

( * ) Notice: Subject to any disclaimer, the term of this patent is extended or adjusted under 35 U.S.C. 154(b) by 0 days.

(21) Appl. No.: 16/984,595

(22) Filed: Aug. 4, 2020

(65) Prior Publication Data

US 2020/0361362 A1    Nov. 19, 2020

Related U.S. Application Data

(62) Division of application No. 16/814,270, filed on Mar. 10, 2020.

(60) Provisional application No. 62/816,571, filed on Mar. 11, 2019.

(51) Int. Cl.
*B60N 2/34* (2006.01)
*B60P 3/36* (2006.01)
*B60R 15/02* (2006.01)
*B60P 3/34* (2006.01)

(52) U.S. Cl.
CPC ............... *B60N 2/34* (2013.01); *B60P 3/34* (2013.01); *B60P 3/36* (2013.01); *B60R 15/02* (2013.01)

(58) Field of Classification Search
CPC ...... B60P 3/36; B60P 3/38; B60P 3/34; B60N 2/34; B60R 15/02
See application file for complete search history.

(56) References Cited

U.S. PATENT DOCUMENTS

| | | | | |
|---|---|---|---|---|
| 3,246,347 | A | * 4/1966 | Mason | B60N 2/34 5/9.1 |
| 4,457,553 | A | 7/1984 | Larkin | |
| 4,505,509 | A | * 3/1985 | Simeri | B60P 3/423 296/156 |
| 4,975,992 | A | 12/1990 | Patterson et al. | |
| 5,697,666 | A | 12/1997 | Hanemaayer | |
| 5,788,329 | A | * 8/1998 | Pilarczyk | B60P 3/38 297/354.13 |
| 5,913,570 | A | * 6/1999 | Yoshida | B60N 2/3013 296/65.09 |

(Continued)

FOREIGN PATENT DOCUMENTS

| | | |
|---|---|---|
| CN | 108725302 A | 11/2018 |
| DE | 3943398 A1 | 7/1991 |

(Continued)

OTHER PUBLICATIONS

PCT/US2020/021863 International Search Report and Written Opinion dated Oct. 12, 2020.

*Primary Examiner* — Philip F Gabler
(74) *Attorney, Agent, or Firm* — Burr & Forman LLP; Jeffrey H. Kamenetsky

(57) ABSTRACT

A vehicle retrofit system comprising a storage receptacle, a collapsible privacy/shower curtain receptacle, a folding counter assembly, and a seat/bed conversion assembly each of which is configured to be contained and deployed within an interior of a vehicle.

6 Claims, 26 Drawing Sheets

(56) References Cited

U.S. PATENT DOCUMENTS

| | | | |
|---|---|---|---|
| 6,371,556 B1 | 4/2002 | Arai | |
| 6,412,870 B1 | 7/2002 | Higgins et al. | |
| 6,540,295 B1 * | 4/2003 | Saberan | B60N 2/206 |
| | | | 297/283.3 |
| 6,604,471 B1 | 8/2003 | Tarver, Jr. | |
| 6,609,753 B2 | 8/2003 | Schmidt-Schaeffer | |
| 6,663,179 B2 * | 12/2003 | Sunohara | B60N 2/3011 |
| | | | 296/69 |
| 6,715,825 B2 | 4/2004 | Tame | |
| 7,156,442 B2 | 1/2007 | McManus et al. | |
| 7,159,937 B2 | 1/2007 | Williamson et al. | |
| 7,168,111 B2 | 1/2007 | Bernstein et al. | |
| 7,172,252 B2 | 2/2007 | Henning | |
| 7,182,403 B2 | 2/2007 | Williamson et al. | |
| 7,195,319 B2 | 3/2007 | Williamson et al. | |
| 7,210,740 B2 | 5/2007 | Chintapudi et al. | |
| 7,380,883 B2 | 6/2008 | Koumura | |
| 7,427,102 B2 | 9/2008 | Wagner et al. | |
| 7,481,486 B2 | 1/2009 | Rashidy et al. | |
| 7,559,608 B2 | 7/2009 | Miyahara et al. | |
| 7,631,936 B2 | 12/2009 | Fukukawa et al. | |
| 7,703,851 B2 | 4/2010 | Nakaya et al. | |
| 7,798,446 B2 * | 9/2010 | Park | B64D 11/0643 |
| | | | 244/118.6 |
| 7,878,595 B2 | 2/2011 | Imajou | |
| 7,896,432 B2 | 3/2011 | Dunkel | |
| 8,360,529 B2 | 1/2013 | Armbruster | |
| 8,414,056 B1 | 4/2013 | Aller | |
| 8,430,455 B2 | 4/2013 | Douceau et al. | |
| 8,864,071 B2 | 10/2014 | Vergnaud et al. | |
| 9,073,608 B1 * | 7/2015 | Foss | B60N 2/22 |
| 9,096,146 B2 | 8/2015 | Hoyle | |
| 9,168,846 B2 | 10/2015 | Sasaki et al. | |
| 9,315,120 B2 | 4/2016 | Stewart et al. | |
| 9,629,471 B2 | 4/2017 | Van Hool et al. | |
| 9,676,305 B2 | 6/2017 | Gujarathi et al. | |
| 9,738,185 B1 | 8/2017 | Guygaew | |
| 9,764,662 B1 | 9/2017 | Ramos Valencia et al. | |
| 9,854,912 B2 | 1/2018 | Iacobucci | |
| 9,969,306 B1 | 5/2018 | Lin | |
| 10,005,376 B2 | 6/2018 | Supernavage et al. | |
| 10,065,535 B1 | 9/2018 | Line et al. | |
| 10,081,270 B1 * | 9/2018 | Line | B60N 2/882 |
| 10,118,511 B2 | 11/2018 | Ziolek et al. | |
| 2009/0249982 A1 | 10/2009 | Palethorpe | |

FOREIGN PATENT DOCUMENTS

| | | |
|---|---|---|
| FR | 2491407 A1 | 4/1982 |
| WO | WO2013/166390 A1 | 11/2013 |
| WO | WO2015/155687 A1 | 10/2015 |

* cited by examiner

RV RETROFIT SYSTEM

CROSS REFERENCE TO RELATED APPLICATION

This application is a divisional of U.S. Non-Provisional patent application Ser. No. 16/814,270, which claims priority to U.S. Provisional Patent Application No. 62/816,571, entitled, RV Retrofit System, the disclosure of which is incorporated by reference.

FIELD

The present disclosure relates to recreational vehicles and more specifically to a system for optimizing the interior space within a vehicle.

INTRODUCTION

Users of vehicles, such as, for example, recreational vehicles (RVs), are faced with a variety of issues one of which is the inherent problem of finite interior space and how to best utilize it. Objects contained within an RV like showers, tables, beds, coolers, and work benches, are often large, unwieldy, and cumbersome, and, given the limited footprint within the interior of an RV, it often becomes a challenge how to fit each of these necessary items within the vehicle's interior in an economical manner.

Further, because RVs are often used for overnight trips, sleep accommodations must be made. Thus, the RV must not only be able to sit multiple people, but there also must be space within the RV's interior to contain multiple beds.

While large RVs may be able to accommodate many of the items mentioned above and also provide sleeping accommodations for multiple people, it is often undesirable to provide such a large vehicle.

What is therefore needed is a system that allows numerous essential items, such as showers, storage facilities, working facilities, and resting/sleeping facilities, to be deployed within a limited interior space of a recreational vehicle.

SUMMARY

In one aspect of the present disclosure, a deployable privacy curtain assembly for use within the interior of a recreational vehicle is provided. The assembly includes an upper storage receptacle attachable to a surface in an interior of a vehicle, the upper storage receptacle configured to retain a foldable privacy curtain in a first non-deployed configuration, the privacy curtain extendable towards a bottom surface of the interior of the vehicle in a second deployed configuration In accordance with another aspect, a foldable counter assembly for use within the interior of a recreational vehicle is provided. The assembly includes a first lower support member and a second lower support member spaced apart from the first lower support member; a first panel stored in a substantially vertical non-deployed configuration above the first lower support panel, the first panel having a first end and a second end, a first side and a second side; a second panel stored in a substantially vertical non-deployed configuration above the second lower support panel, the second panel having a first end and a second end, a first side and a second side; the first and second panels configured to be converted from the non-deployed configuration to a substantially horizontal deployed configuration to form a horizontal support surface; and at least one of the first panel and the second panel include a pair of support legs, the support legs being vertically extendable towards a bottom surface of the vehicle when the panel to which it is attached is in the deployed configuration thereby providing support for the substantially horizontal surface.

In accordance with another aspect, a seat/bed conversion assembly for use within the interior of a recreational vehicle is provided. The seat/bed conversion assembly includes a substantially horizontal seat comprising two sections, one section configured to pivot upon a first axis with respect to the second section, a backrest configured to be maneuvered from a substantially vertical position to a substantially horizontal position with respect to the seat, the backrest comprising a lower portion configured to pivot about a second axis from a first position to a second position; and an upper portion configured to pivot about a third axis from a third position to a fourth position.

BRIEF DESCRIPTION OF THE DRAWINGS

FIG. 8 is a another perspective view of the collapsible privacy/shower curtain in a fully deployed configuration using the storage receptacle portion as a base for the user to stand in;

DETAILED DESCRIPTION

The present disclosure relates to an easily adaptable, multi-purpose interior vehicle retrofit system that provides a plurality of deployable functional assemblies that, either individually, or collectively, efficiently utilize the limited floor space within a vehicle such as, for example, a recreational vehicle.

Figure 1:
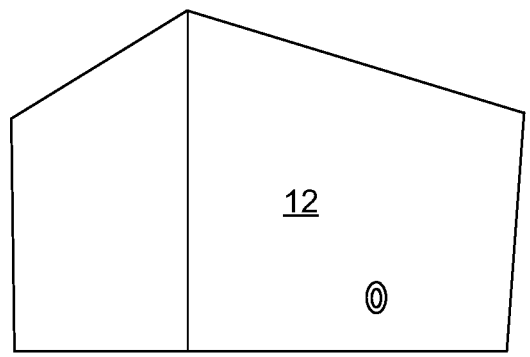
FIG. 1 is a perspective view of the storage receptacle portion and collapsible privacy/shower curtain receptacle portion of the RV retrofit system of the present disclosure.
Figure 1:
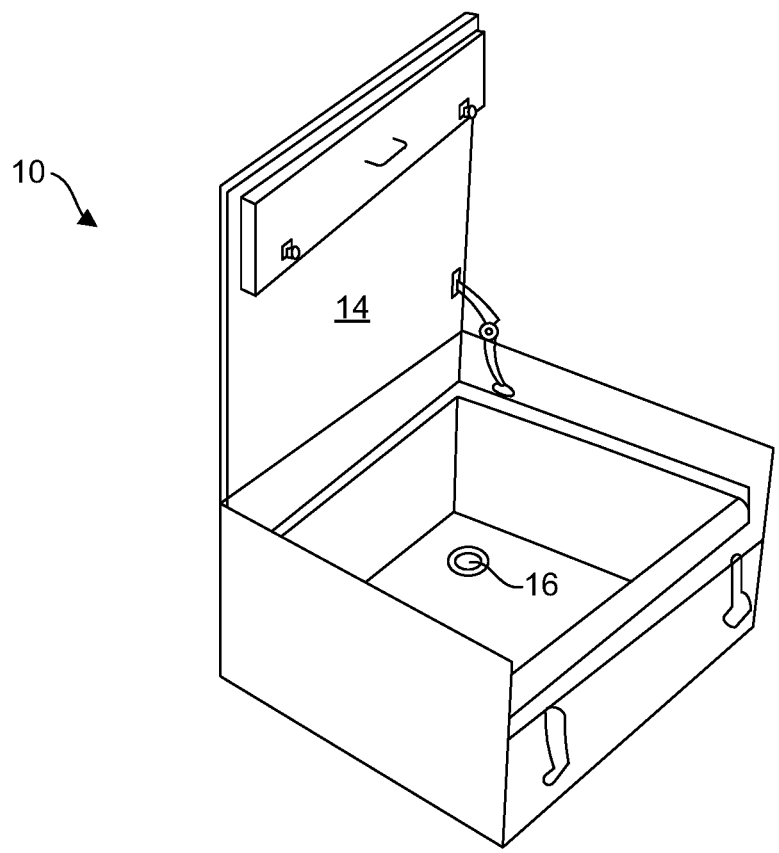

Referring now to the figures, FIG. 1 illustrates an embodiment of a storage receptacle portion 10 and collapsible privacy/shower curtain receptacle portion 12 of the RV retrofit system of the present disclosure. Storage receptacle portion 10 is an enclosure constructed, in one embodiment, of rigid side panels, a bottom surface, and a top lid 14 pivotally connected to the enclosure. The lid can be affixed by any rotatable means such as hinges. In one embodiment, the enclosure includes a shower pan and a drain 16 which, when storage receptacle portion 10 is used in a shower configuration, allows water to drain therethrough.

Figure 2:
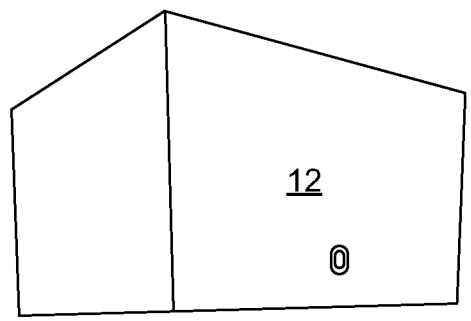
FIG. 2 is a perspective view of the separable storage receptacle portion housing an item.
Figure 2:
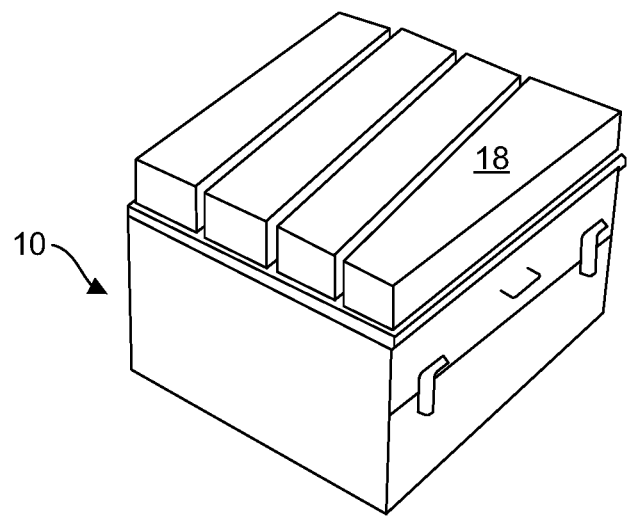
Figure 3:
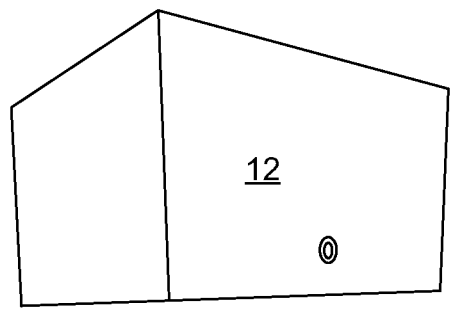
FIG. 3 is a perspective view of the separable storage receptacle portion housing a different item.
Figure 3:
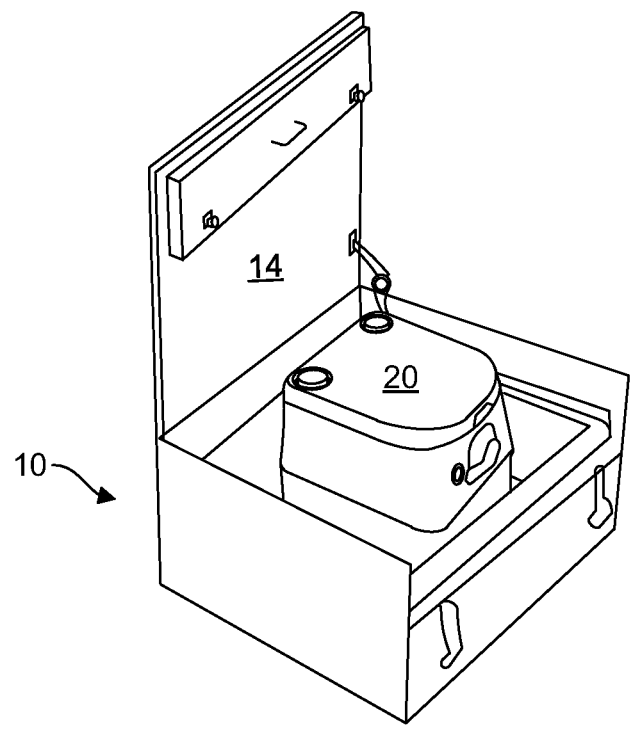
Figure 4:
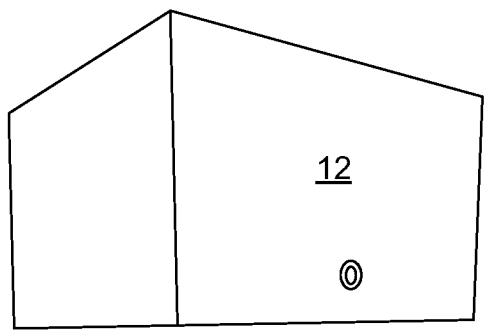
FIG. 4 is a perspective view of the separable storage receptacle portion housing yet a different item.
Figure 4:
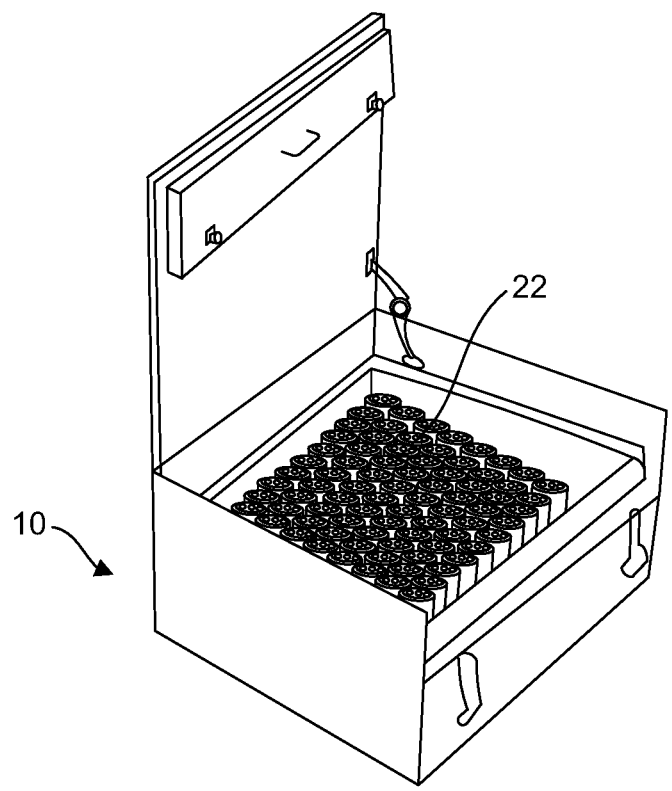

It is understood that in one configuration, storage receptacle portion 10 can be utilized to store items that, for example, may be desirable or necessary while traveling. For example, storage receptacle portion 10 may be utilized to house removable cushions 18 as shown in FIG. 2, a removable toilet 20 as shown in FIG. 3, or beverages 22 as shown in FIG. 4. The examples of items to be stored within the enclosure of storage receptacle portion 10 discussed herein and depicted in the figures is exemplary only. Storage receptacle portion may be configured to house and store any items that may be deemed desirable or necessary for traveling in a vehicle.

In another embodiment, storage receptacle portion 10 can be used in a shower configuration where it is used in conjunction with a fully deployable privacy/shower curtain, discussed in greater detail below. The privacy/shower curtain may be stored, when not in use, in privacy/shower curtain receptacle portion 12, shown in FIGS. 1-4. Curtain receptacle portion 12 can be secured within the interior of an RV, for example, to an interior wall, by a bracket or other securing means. Thus, storage receptacle portion 10 can be utilized for multiple configurations, e.g., storage, a basin, floor and drainage system in a shower, and can also be utilized as a seat or table when lid 14 is closed. Given the limited space within an RV, such multi-purpose usage is advantageous.

Figure 5:
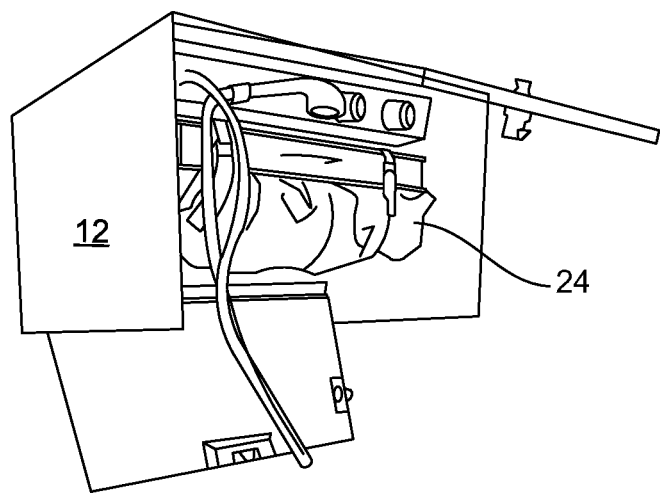
FIG. 5 is a perspective view of the collapsible privacy/shower receptacle portion open to show the collapsible privacy/shower curtain un-deployed and stored therein.
Figure 5:
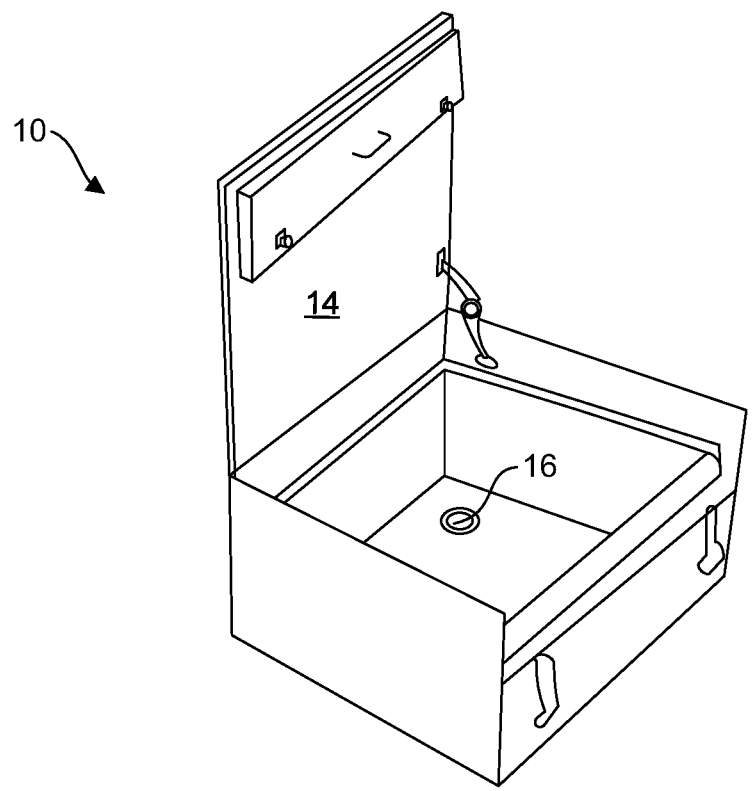

FIG. 5 shows privacy/shower curtain receptacle portion 12 with its lid opened to reveal a privacy/shower curtain 24 contained therein. In this configuration, privacy/shower curtain 24 is not yet deployed. In one embodiment, privacy/shower curtain 24 can be rolled up and stored within receptacle portion 12. Other shower components necessary or desired for use when showering such as a nozzle, hose and water controls can be included along with privacy/shower curtain 24 and stored within shower curtain receptacle portion 12. Privacy/shower curtain receptacle portion 12 can be affixed to the interior ceiling of the RV or to some other sturdy structure within the interior of the RV. Advantageously, when not deployed, privacy/shower curtain 24 can be neatly and securely stored out of site and within a small confined space, i.e., the interior of receptacle portion 12.

Figure 6:
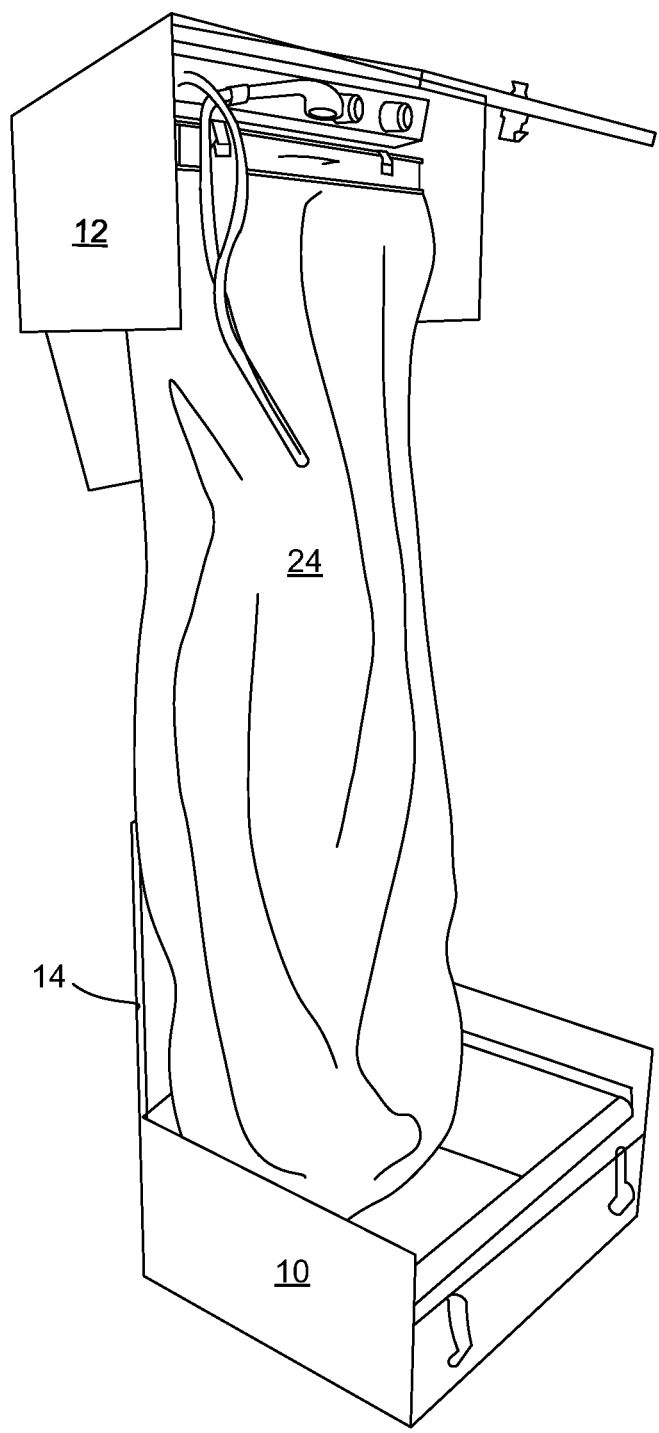
FIG. 6 is a perspective view of the collapsible privacy/shower curtain in a semi-deployed to fully-deployed configuration.

When it is desirable to use the shower, privacy/shower curtain 24 can be deployed by unfolding and allowing the curtain to extend vertically downwards as shown in FIG. 6. Advantageously, the lower portion of privacy/shower curtain 24 extends within the interior of storage receptacle portion 10, which, in this configuration, acts as a shower basin and drain (drain not shown in FIG. 6). Thus, during use, a person can stand within the shower basin that is formed by storage receptacle 10 behind the privacy/shower curtain 24. When not in use, curtain 24 can be folded back within receptacle portion 12 and the door of receptacle portion 12 closed thus hiding its contents. Thus, in its undeployed configuration, shower curtain 24 is hidden and takes up virtually no space within the interior of the vehicle.

Figure 7:
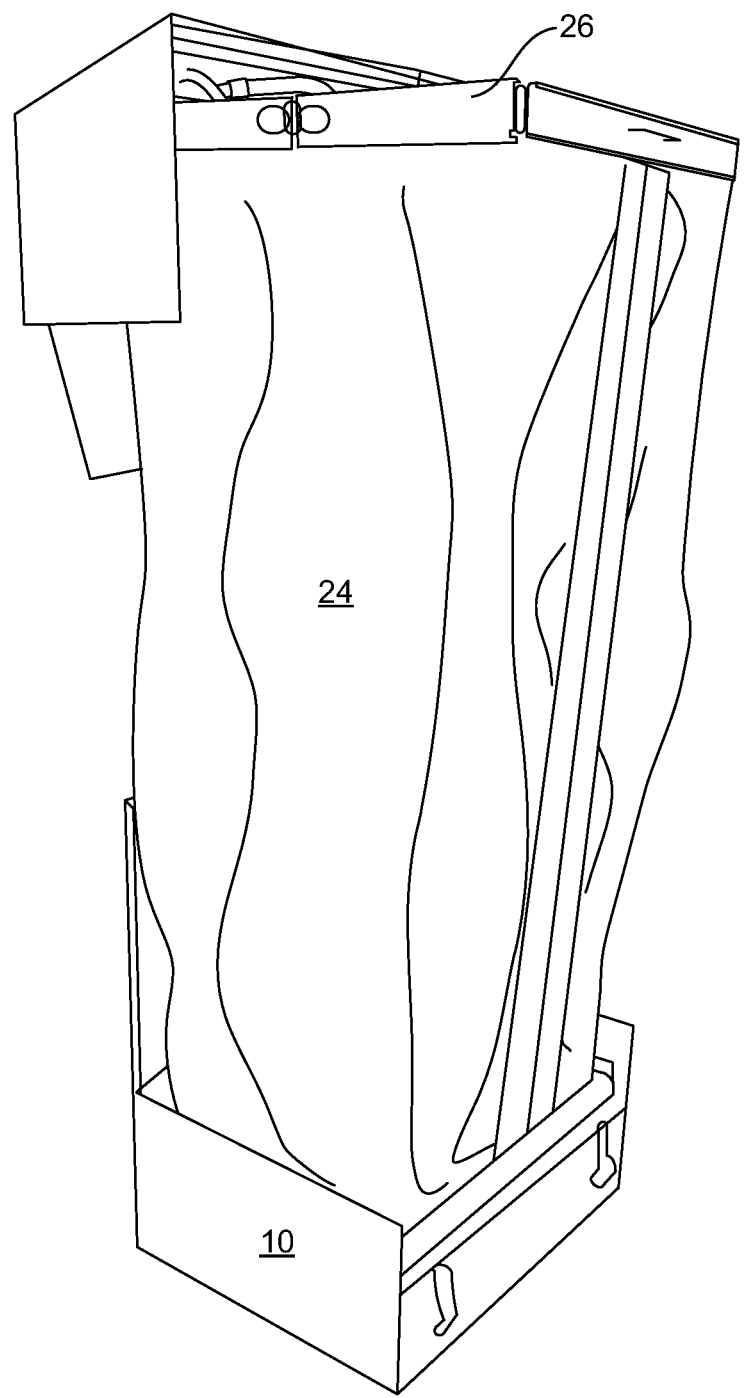
FIG. 7 is a perspective view of the collapsible privacy/shower curtain in a fully deployed configuration using the storage receptacle portion as a shower base and drain.

FIG. 7 shows privacy/shower curtain 24 in its fully deployed configuration, used with storage receptacle portion 10 acting as a shower basin and drain. The top portion of the privacy/shower curtain 24 can be affixed either permanently or removably to an upper support structure 26. In one embodiment, upper support structure 26 can itself collapse or otherwise be slid into shower curtain receptacle portion 12 when the shower is not in use. The shower shown in FIG. 7 is a fully functional shower, with privacy, and when not in use, collapses into the interior of shower curtain receptacle portion 12. Further, storage receptacle portion 10, when not in use as a shower basin and drain, can be used in the manner described above, e.g., storage, a seat, or a table, when the lid is closed. Thus, the footprint taken up by privacy/shower curtain 24 is small, essentially the width of the storage receptacle portion 10 to which the bottom of the privacy/shower curtain extends into.

In an alternate embodiment, privacy/shower curtain 24 can also just be used as a privacy curtain when privacy is needed within the interior of the RV. In this configuration, storage receptacle portion 10 may still be used as a base, or privacy/shower curtain 24 may be used without storage receptacle portion 10.

Figure 8:
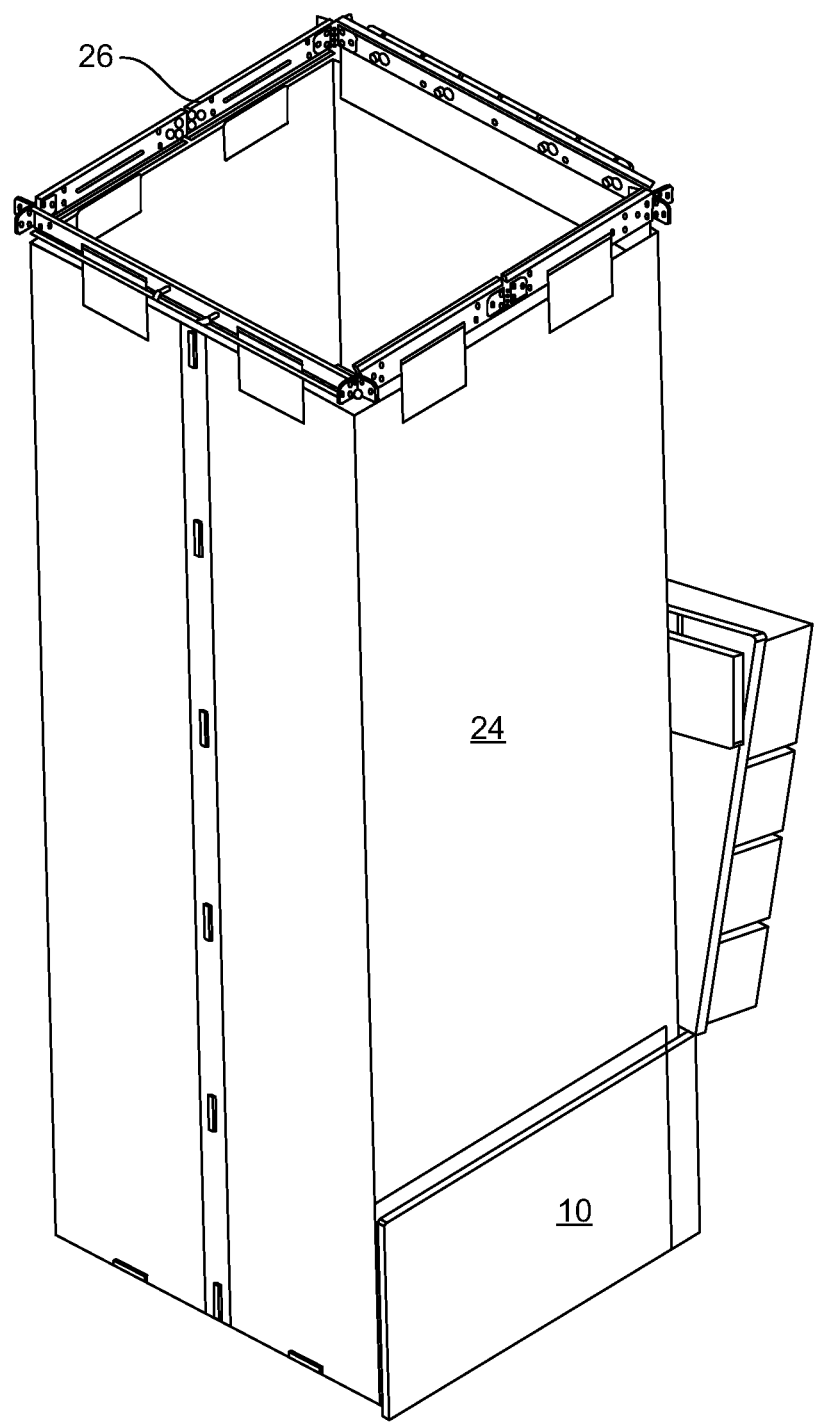

FIG. 8 is another perspective view of the components that comprise the shower including the privacy/shower curtain 24, upper support structure 26 and storage receptacle portion 10. This privacy/shower curtain 24 can be used in conjunction with the storage receptacle portion 10 in the manner described above or act as a stand-alone item to serve as a retractable, stowable, temporary/as-needed indoor/outdoor shower/privacy curtain. As also described above, the design consists of an upper support structure 26, or mounting bracket that, in one embodiment, supports a removable construct of collapsible, hinged rods or panels that easily articulate outwards to an open shower position with an easily foldable privacy/shower curtain 24 attached, or inwards to retract into an easily storable and/or concealed position shower curtain receptacle portion 12.

In a non-limiting, exemplary use case, privacy/shower curtain 24 can be stored in a non-deployed configuration within privacy/shower curtain receptacle portion 12 within the interior of the RV. Receptacle portion 12 could be, in one embodiment, affixed to the ceiling or other sturdy structure within the interior of the RV. A user, wishing to utilize curtain 24, opens receptacle portion 12 and withdraws curtain 24 which is stored therein. The user can also withdraw the shower hose, nozzle, and water controls. The user can let the curtain 24 extend until it reaches the floor of the vehicle, as shown in FIGS. 7 and 8. In one embodiment, the bottom of curtain 24 is within storage receptacle portion 10. Storage receptacle portion 10 may include a shower pan and drain 16, if the user wishes to use the shower. When finished, the user may lift curtain 24 and return it to receptacle portion 12 along with the shower hose, nozzle and water controls. The lid of receptacle portion 12 can then be closed, hiding curtain 24 and other components from sight.

Figure 9:
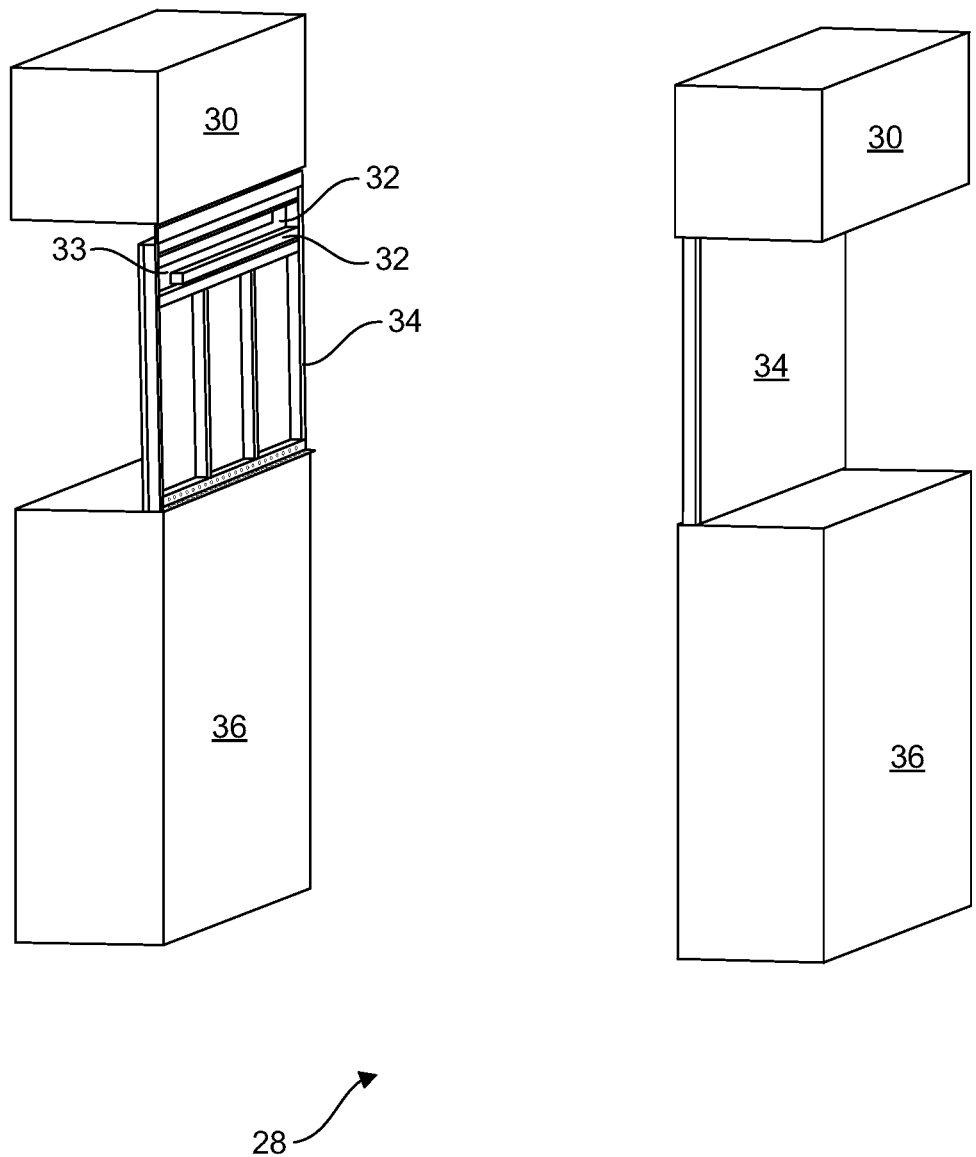
FIG. 9 is a perspective view of the folding counter assembly portion of the RV retrofit system of the present disclosure in a storage configuration.

FIG. 9 is a perspective view of the folding counter assembly 28 portion of the RV retrofit system of the present disclosure in a storage configuration. In one embodiment, folding counter assembly 28 includes opposing upper support members 30, panels 34, and lower support members 36. In one embodiment, one of the two panels 34 that comprise the folding counter assembly 28 includes a pair of folding support legs 32. It is within the scope of the present disclosure to provide one or two pairs of folding support legs 32. Thus, only one of the panels 34 can include support legs 32, as shown in the figures, or, both panels 34 can include support legs 32.

When not in use, panels 34 can each be stored in a substantially vertical orientation between upper support members 30 and lower support members 34. This is shown in FIG. 9. In this fashion, when assembly 28 is not in use, it is stored in such a fashion that the interior of the RV remains clear. In some embodiments, when not in use, the top portion of each panel 34 can be releasably secured to the bottom of a corresponding upper support member 30 to prevent panels 34 from inadvertently deploying and swinging downward. Upper support members 30 can be secured to a portion of the interior of the RV such as the interior ceiling, or walls. In one embodiment, lower support members 36 can be completely or partially hollow and therefore be used for storage. In other embodiments, upper support members 30 are not used. In one embodiment, when not in use, folding support legs 32 can be folded and secured within a compartment 33 on one side of panels 34 as shown in FIG. 9. In another embodiment, (shown in FIG. 10), when panels 34 are not deployed, legs 32 can be folded and secured against the underside of panels 34, i.e., not within a compartment 33. In either orientation, when assembly 28 is not in use, the legs 32 can be folded against the outwards-facing side of the panels 34, thus maintaining a clear space within the RV.

Figure 10:
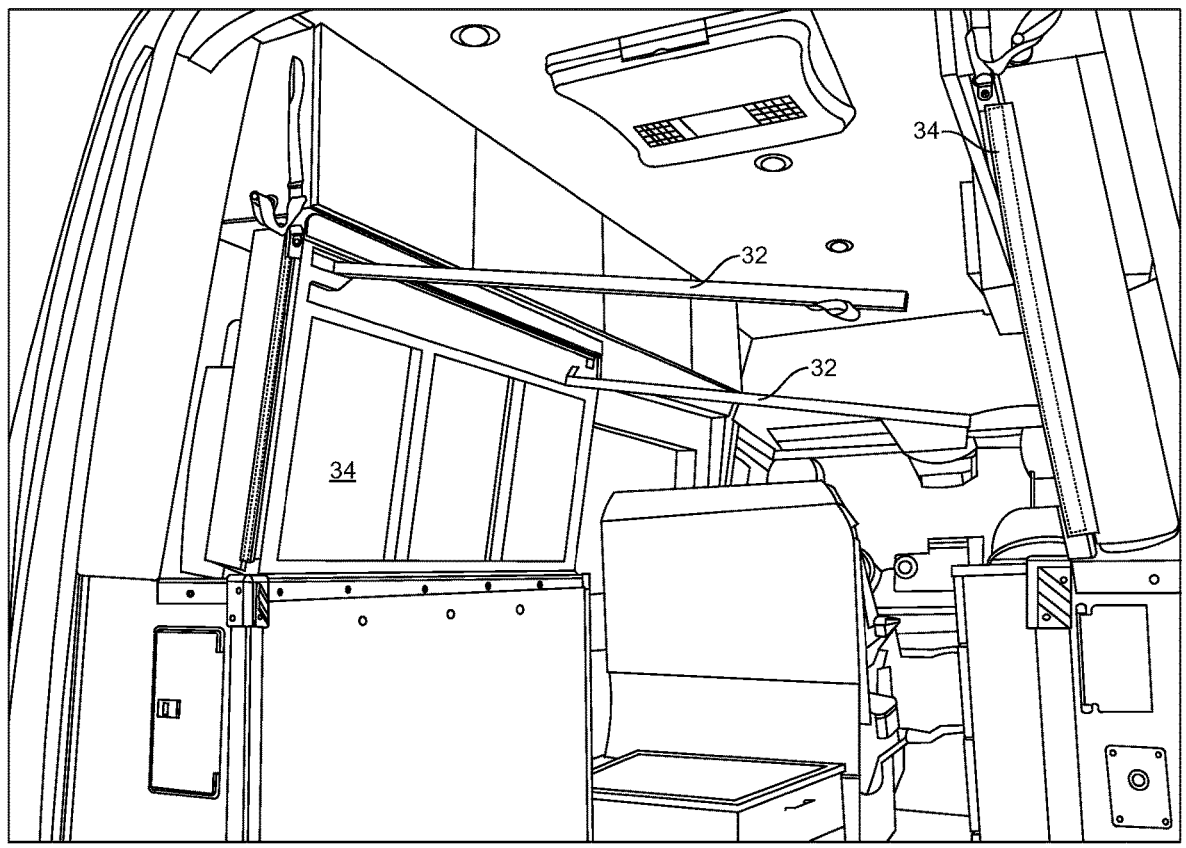
FIG. 10 is a perspective view of the folding counter assembly portion within the interior of a vehicle in a semi-deployed configuration.
Figure 11:
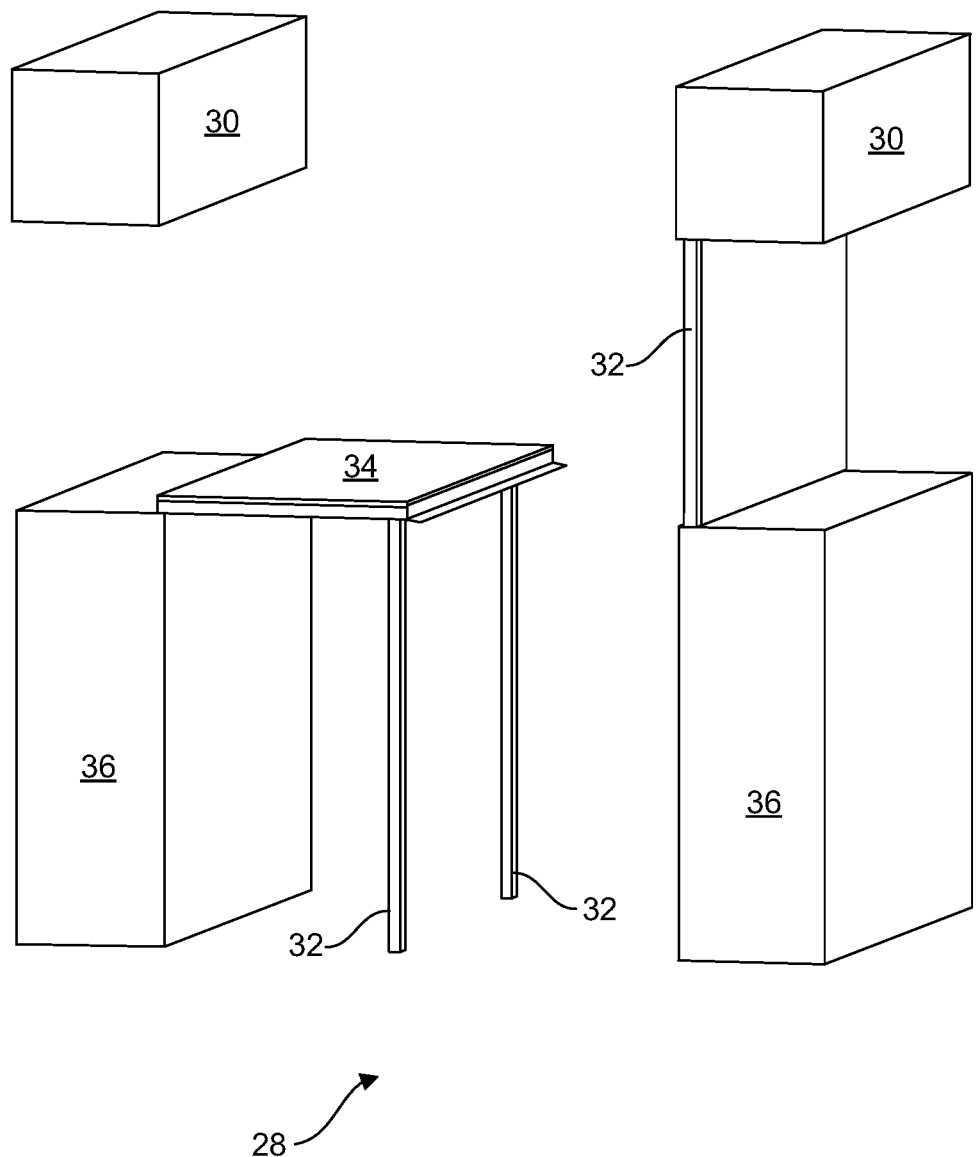
FIG. 11 is a perspective view of the folding counter assembly portion of the RV retrofit system of the present disclosure where one of the two panels is deployed in a working configuration.
Figure 12:
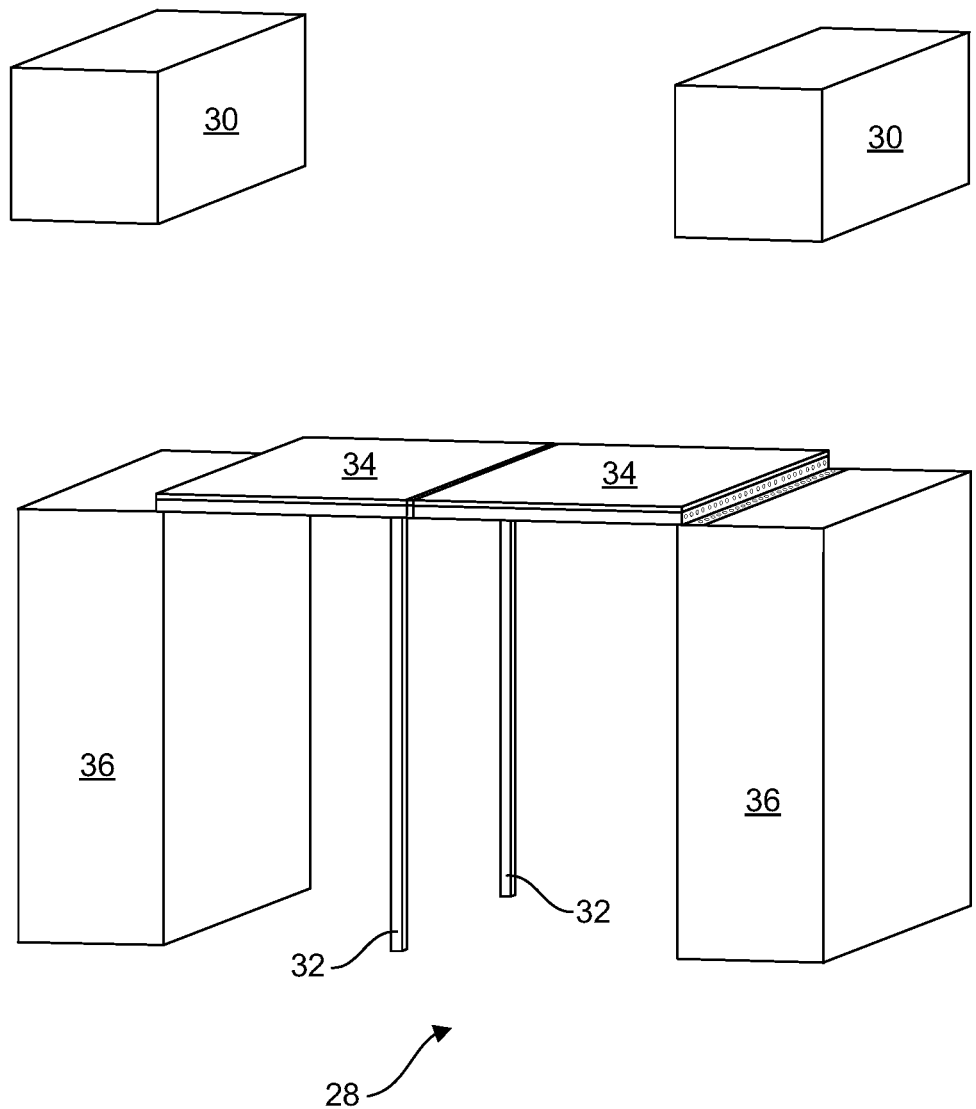
FIG. 12 is a perspective view of the folding counter assembly portion of the RV retrofit system of the present disclosure where both panels are deployed in a fully extended configuration.

When it is desired to deploy the folding counter assembly 28 from its storage orientation, the legs 32 are unfolded and straightened as shown in FIG. 10. From this configuration, the legs 32 can be swung in a downwards direction until they are supported by the floor of the RV in order to allow a first panel 34 to form a substantially horizontal surface, as shown in FIG. 11. The result is a shelf or table formed by the extended folding support legs 32 which support the substantially horizontal 34 panel. The shelf or table can be further extended by swinging the second panel 34 in a downwards direction in the same manner described above where the second panel 34 abuts the first panel 34 as shown in FIG. 12, thus forming an extended surface. The two panels 34 can be joined to each other or, in another embodiment, can abut each other such that they will not separate if pressure is applied in a downwards direction. For example, in one embodiment, one of the two panels 34 includes a substantially horizontal-extending lip, which supports the other panel 34, thus creating an extended substantially horizontal surface that is fully supported when weight is applied. This surface can be used as, for example, a table for eating, or a workbench for reading or writing, etc.

Thus, the folding counter assembly 28 portion of the RV retrofit system of the present disclosure, when in its fully deployed configuration, consists of two manufactured panels 34 of various substrates that are positioned directly across from one another at a set distance, and which rest upon and are affixed to a supportive structure via a hinged mechanism allowing the panels 34 to independently fold up or down revealing a workbench resting on folding support legs 32 (one of the two panels 34 in a horizontal position) or even an extended support bench or supportive sleep surface (two panels 34 interlocked, joined or otherwise abutting each other). When not in use, the folding counter assembly 28 can be stored (as described above and shown in FIG. 9) with a minimal footprint. In the context of an RV, camper trailer, or "tiny house," the space-saving advantages of such a configuration are invaluable.

Figure 13:
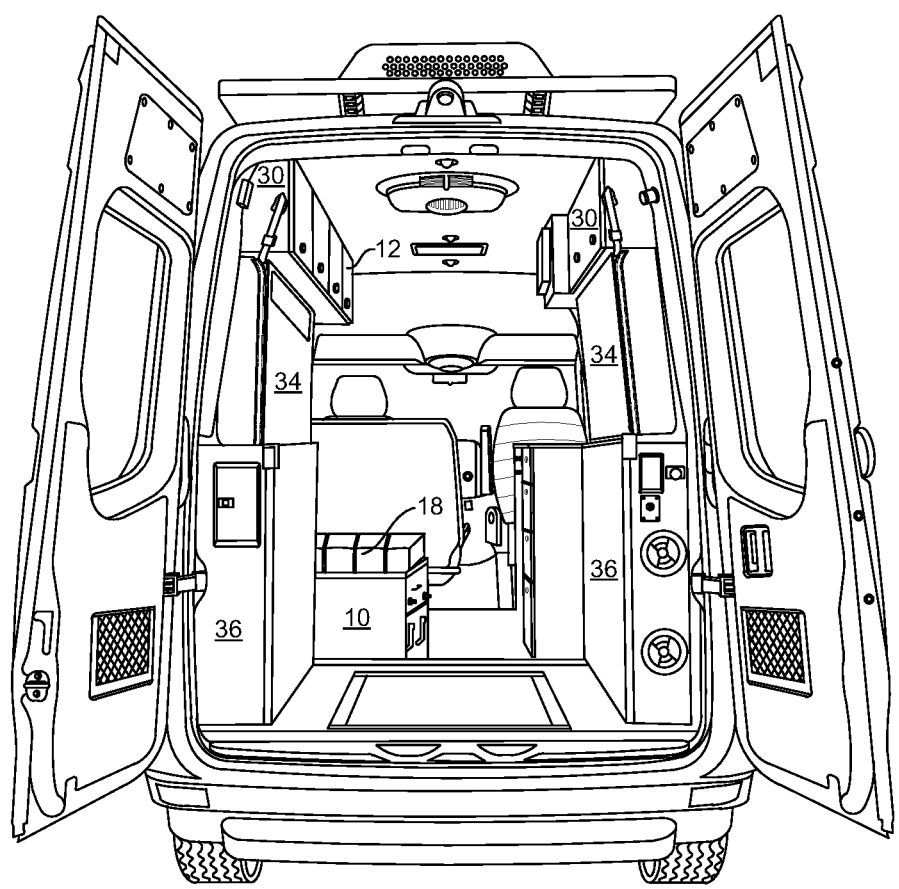
FIG. 13 is a view showing the components of the folding counter assembly in a storage configuration within the confines of a vehicle.
Figure 14:
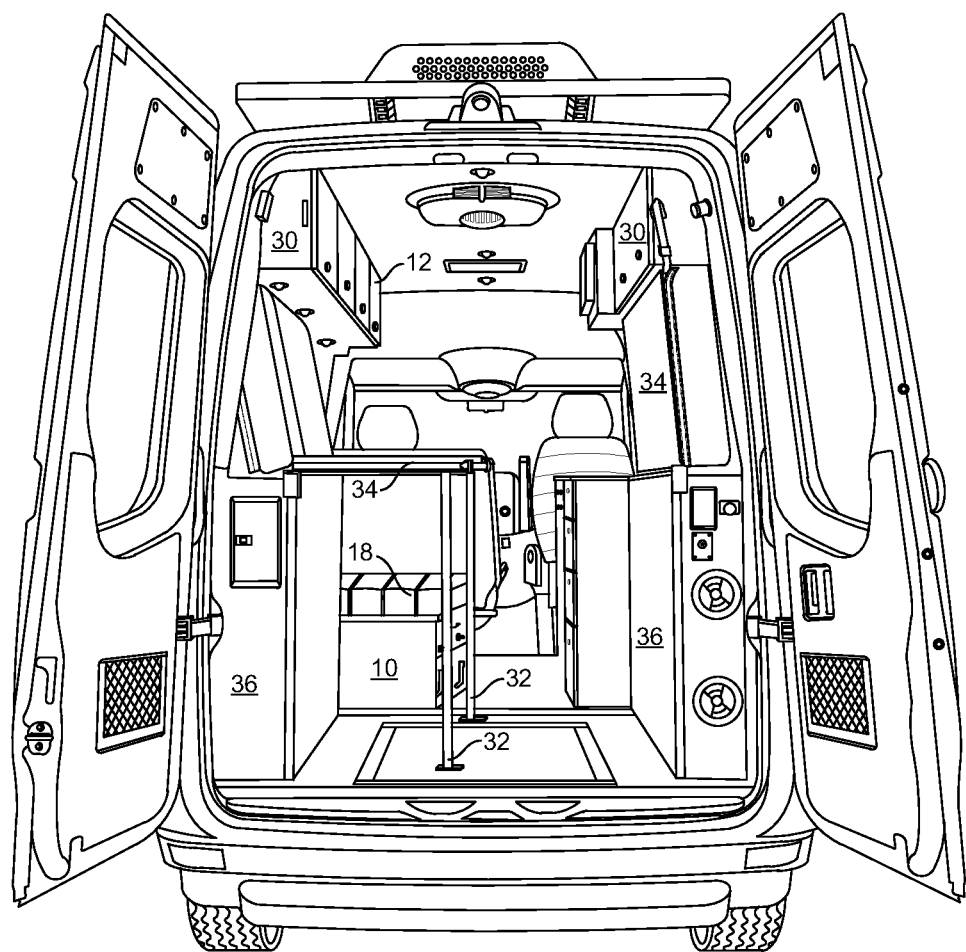
FIG. 14 is a view showing the components of the folding counter assembly in a working configuration within the confines of a vehicle.
Figure 15:
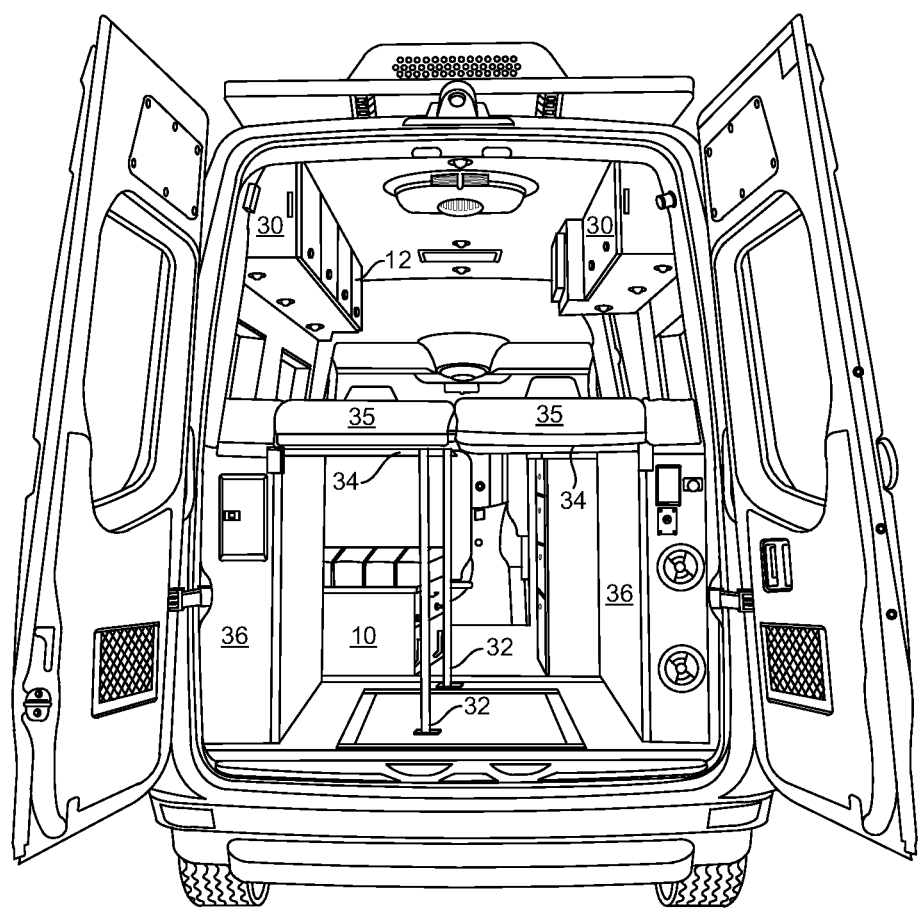
FIG. 15 is a view showing the components of the folding counter assembly in a fully extended configuration within the confines of a vehicle.

FIGS. 13-15 illustrate how the folding counter assembly 28 fits within the confines of a vehicle, for example, an RV. FIG. 13 shows the folding counter assembly 28 in an un-deployed configuration within the interior space of an RV. The upper support members 30 and lower support members 36 are secured to the sides of the RV thus allowing for egress within the vehicle. In some embodiments, upper support members 30 are not included, or, are instead storage bins along the upper side wall of the vehicle. In FIG. 14, one of the panels 34 has been deployed and folded downward resulting in a substantially horizontal support surface, in the manner described above. The folding support legs 32 have been deployed to support the panel 34. In FIG. 15, both panels 34 have been deployed and abut one another or secured to each other thus forming an extended support surface such that excess downward pressure about the horizontal surface created by the two panels would not separate the panels 34. In this embodiment, only one pair of support legs 32 is utilized, although a second pair, extended from the opposite panel 34 may also be utilized, if needed. The horizontal surface, supported by the folding support legs 32, can support, for example, up to 800 pounds of downward pressure, however this is not a limiting feature. The horizontal surface can be used to support a variety of items including but not limited to gear, a person sitting or lying thereon, food, or other items like a bicycle and the like. In some instances, the upwards-facing surface of panel 34 can be used as a writing surface. In certain embodiments, panels 34 are rotatably affixed to the top portion of its respective lower support member 36.

In some embodiments, cushions 35 are placed and/or secured to the upwards-facing surface of each panel 34, as shown in FIG. 15. Thus, for example, when it is desirable to use the horizontal surface formed by panel 34 as a seat or bed (for example with both panels 34 are extended together to form an elongated surface), the cushions 35 can be used. When cushions 35 are placed upon the upward-facing surfaces of panels 34, the surface can be used as a couch or bed.

In a non-limiting exemplary use case, when not in use, panels 34 are folded in a substantially vertical orientation against the interior wall of the RV as described above and shown in FIG. 13. The lower portion of panels 34 are hingedly connected to the top portion of a respective lower support member 36. In some embodiments, upper support members 30 help secure the tops of panels 34 in a substantially vertical position when not in use. A user, wishing to use folding counter assembly 28, unfolds the legs 32 that are secured or otherwise positioned against the exposed side of one of the panels 34 and pivots the panel 34 in a downward direction until panel 34 is in a substantially horizontal position, supported by legs 32. In another embodiment, the user can swing a second panel 34 in a downward direction until it abuts the first panel 34, thus forming an extended horizontal surface. In other embodiments, a second pair of legs 32 from the other panel may be used for support. In some embodiments, the user can join the panels 34 together by use of a latch or equivalent mechanism. In another embodiment, one of the panels 34 includes an extended lower lip upon which the opposing panel 34 rests. In one embodiment, one or more cushions 35 can be placed upon the upward-facing surface of panels 34.

Figure 16A:
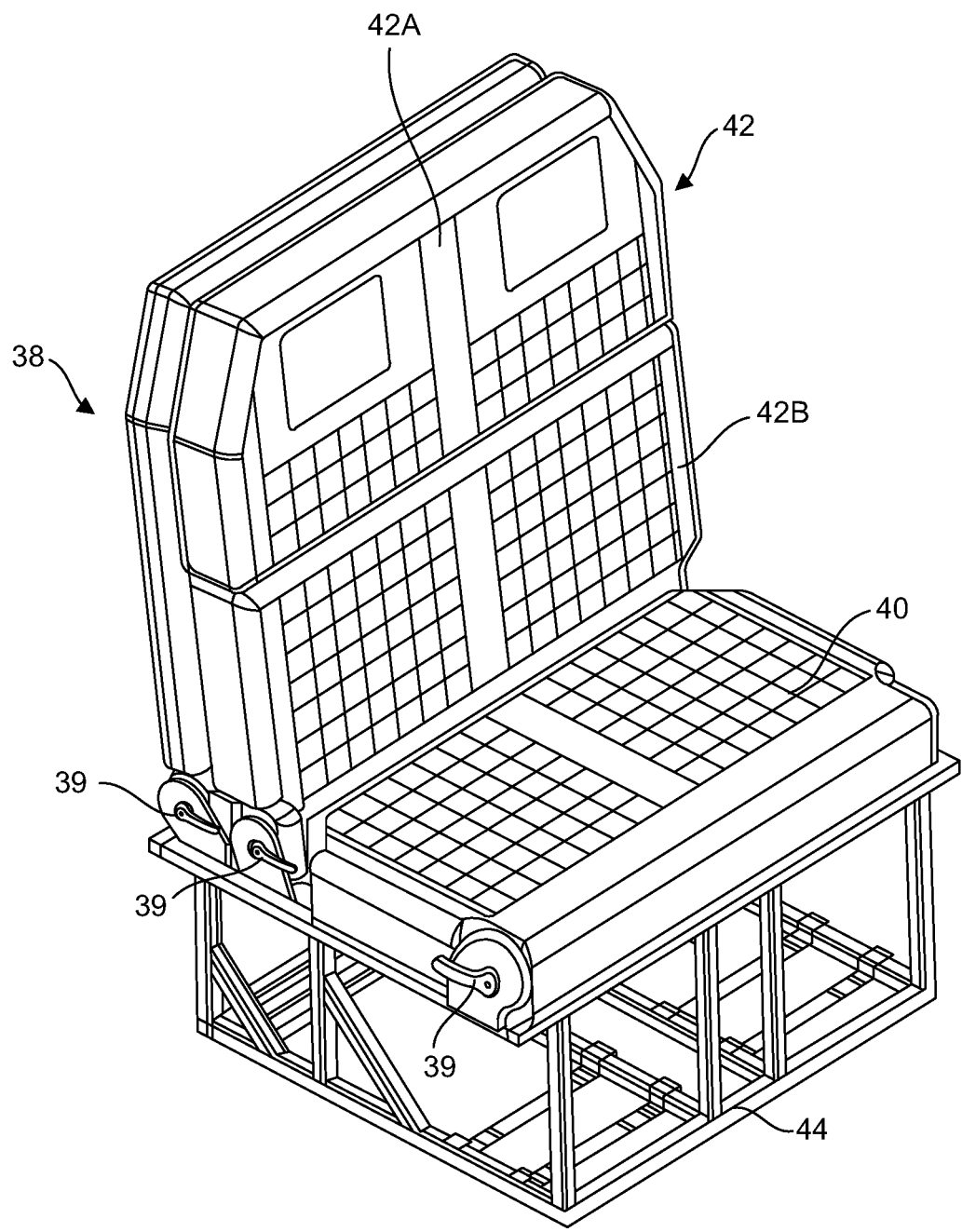
FIG. 16A is a perspective view of the seat/bed conversion assembly portion of the RV retrofit system of the present disclosure in a substantially upright position.

FIG. 16A is a perspective view of the seat/bed conversion assembly 38 portion of the RV retrofit system of the present disclosure in a substantially upright position. Seat/bed conversion assembly 38 consists of a forward facing, or potentially side-facing one or more person seat/bench 40 that utilizes a series of mechanisms to produce a sequence of folding/articulating/adjustment capabilities allowing the various surfaces of the seat 40 to adjust from an upright, seat-belted position into various stages of recline all the way to a fully extended horizontal bed, as will be shown in the ensuing figures. Handle/levers 39 can be used to adjust the seat/bed conversion assembly to its various stages of recline. However, the handle/levers 39 shown in the figures is exemplary only and other means of adjusting the angle of assembly 38 can be used, for example, a foot pedal(s), push button(s), or handle(s) or lever(s) positioned in a location other than in the location shown in the figures.

Assembly 38 includes a backrest 42, which also is capable of being adjusted in various configurations from the upright seat configuration shown in FIG. 16A to various other configurations shown in the ensuing figures. In one embodiment, backrest 42 is formed of two portions, upper portion 42A and lower portion 42B. The design includes a seat pedestal design and floor mounting system 44 for automotive applications in addition to the top frame of panels and recline mechanisms that produce the aforementioned actions that can be utilized in both automotive and non-automotive applications.

Figure 16B:
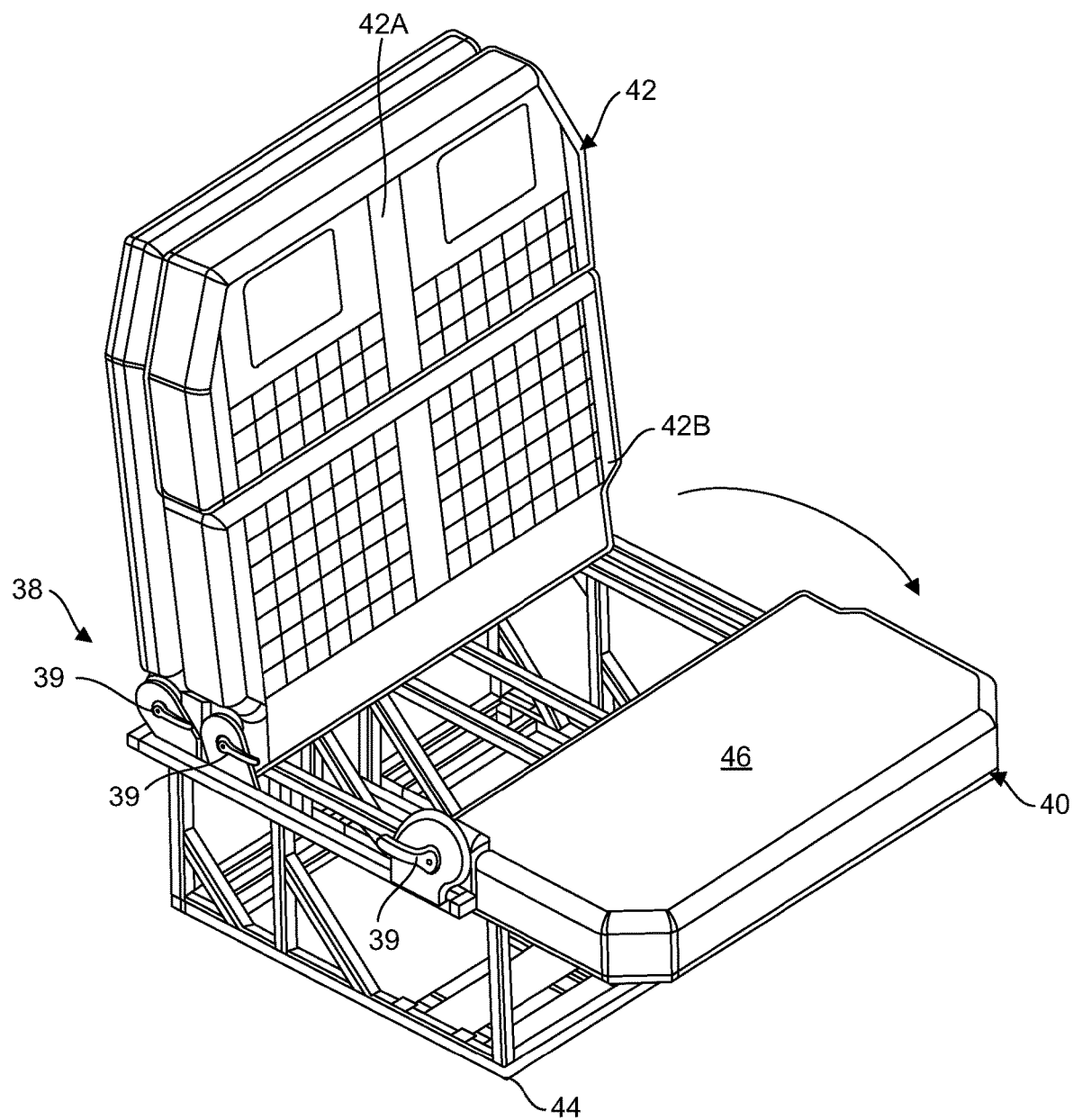
FIG. 16B is a perspective view of the seat/bed conversion assembly portion of the RV retrofit system of the present disclosure in a first partially deployed configuration.

FIG. 16B shows assembly 38 where a portion of seat 40 has been rotated along the direction of the arrow such that the underside 46 of a portion of seat 40 is now exposed. In one embodiment, the underside 46 of seat 40 is a cushion or pillow, or otherwise soft surface to allow a person to sit thereon.

Figure 16C:
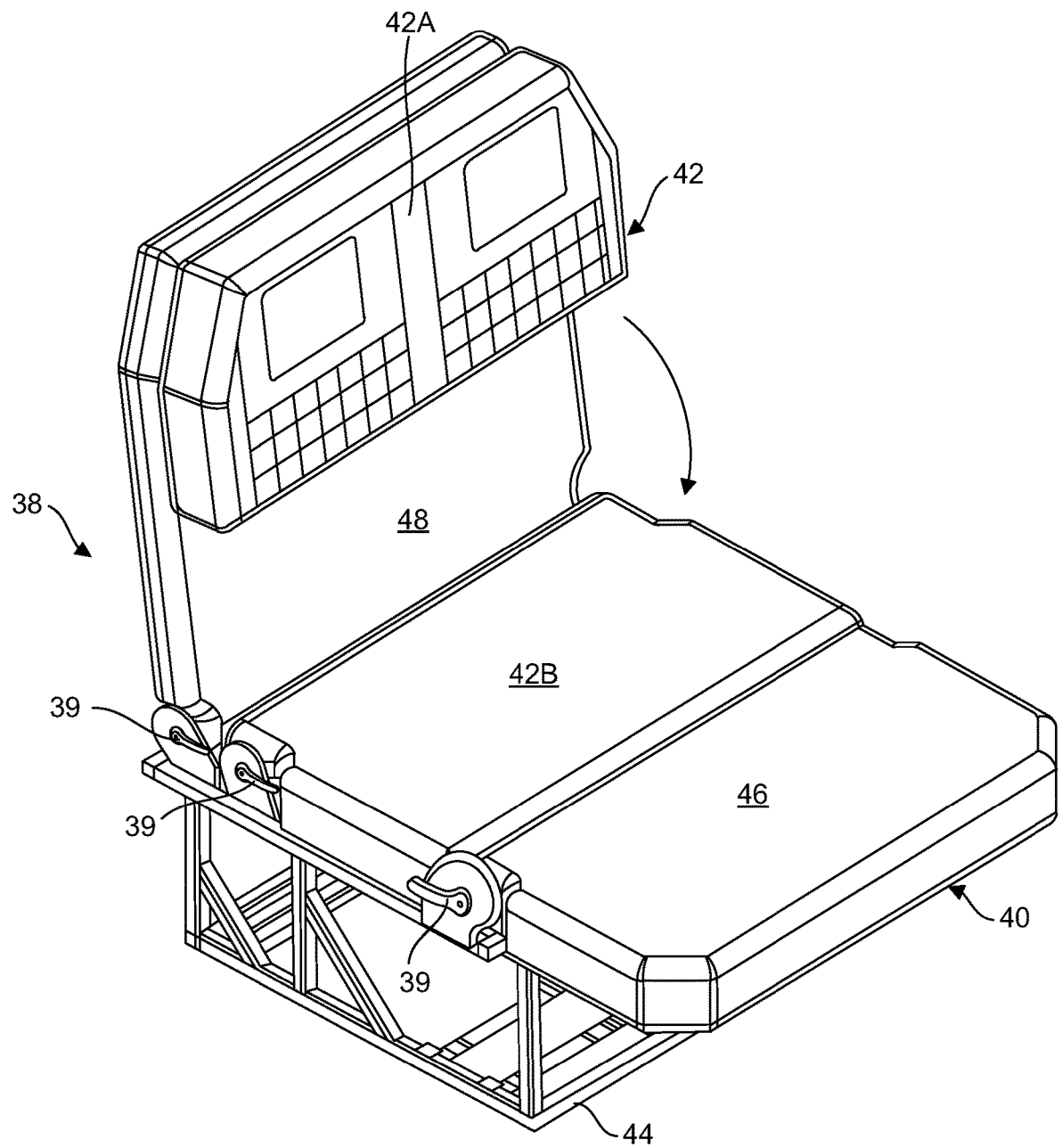
FIG. 16C is a perspective view of the seat/bed conversion assembly portion of the RV retrofit system of the present disclosure in second partially deployed configuration.

FIG. 16C shows the lower portion 42B of backrest 42 having been rotated in the direction of the arrow to abut the underside 46 of seat 40 to form an extended seating surface. For example, a user's head and upper part of their body can rest against upper portion 42A with remaining portion of the user resting on lower portion 42B and underside 46 of seat 40. An exposed surface 48 that was beneath lower portion 42B of backrest 42 is now exposed.

Figure 16D:
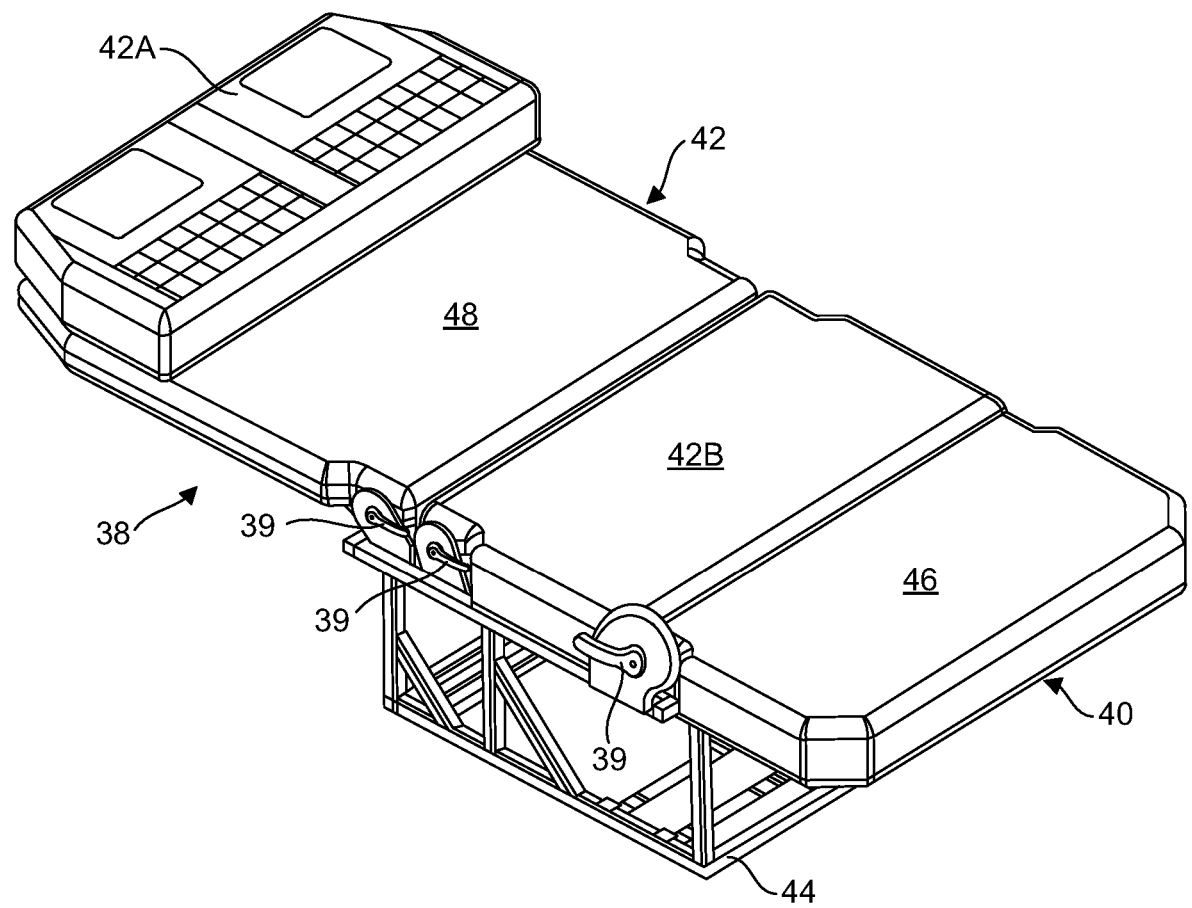
FIG. 16D is a perspective view of the seat/bed conversion assembly portion of the RV retrofit system of the present disclosure in substantially reclined configuration.

FIG. 16D shows the configuration of assembly 38 of FIG. 16C but in a fully reclined bed configuration. In one embodiment, exposed surface 48 is substantially flush with the surface of lower portion 42B and underside 46 of seat 40 to create a resting/sleeping surface. Upper portion 42A of backrest 42 may be used, for example, as a head rest or pillow. It should be known that the positions of assembly 38 shown in FIGS. 16A through 16D are exemplary only, and assembly 38 can be maneuvered and held in place in virtually any position between a substantially upright seated configuration shown in FIG. 16A to a fully reclined configuration shown in FIG. 16D.

Figure 16E:
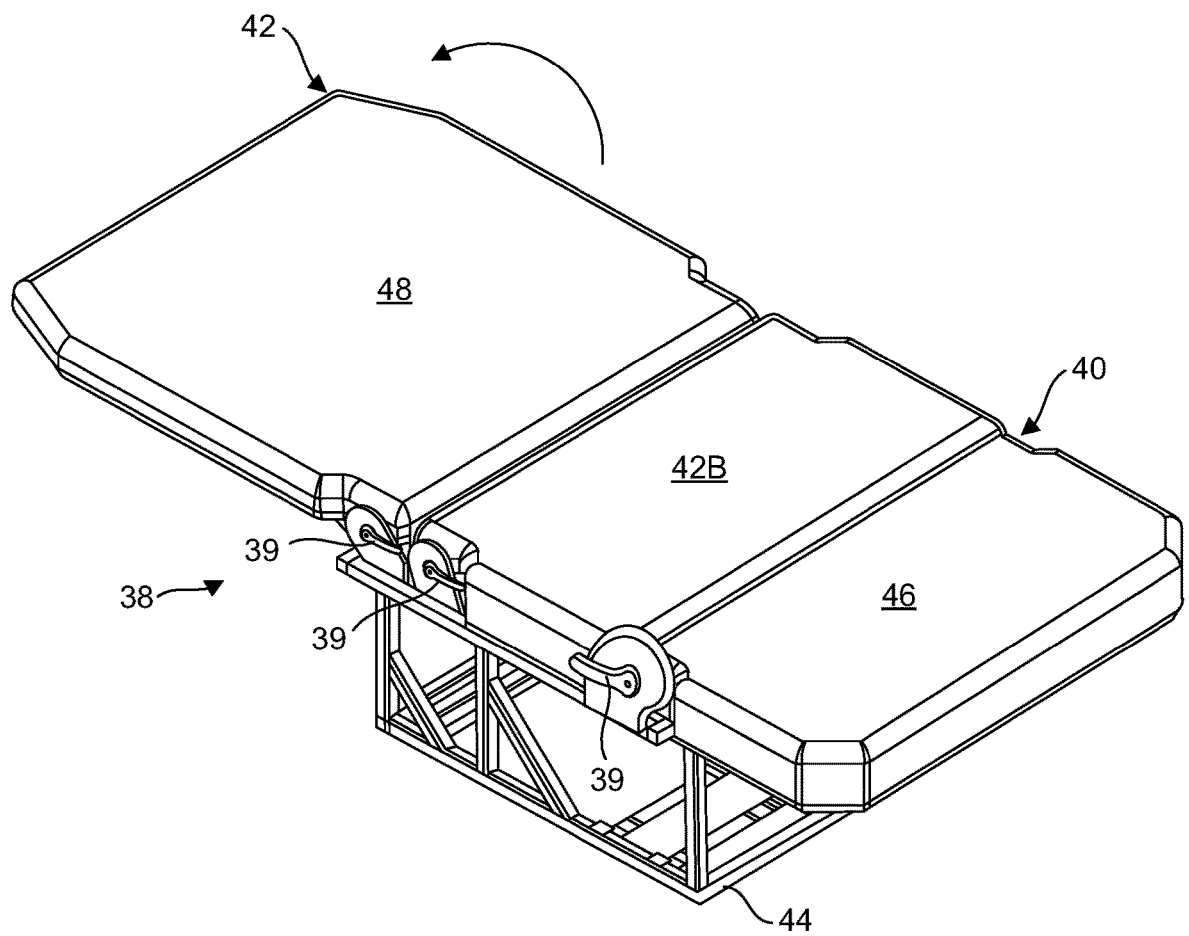
FIG. 16E is a perspective view of the seat/bed conversion assembly portion of the RV retrofit system of the present disclosure in fully reclined configuration.

FIG. 16E shows the assembly of FIG. 16D but now upper portion 42A of backrest 42 has been rotated upwards along the lines of the arrow. In this configuration, exposed surface 48 is now lengthened to create an even longer resting/sleeping surface, formed by exposed surface 48, lower portion 42B and underside 46. Thus, FIGS. 16A through 16E show various configurations where assembly 38 can be used as both a seat and bed within the confines of a vehicle.

Thus, assembly 38 includes a substantially horizontal seat 40 that includes two sections, one section configured to pivot upon a first axis with respect to the second section, as shown in FIG. 16B. Assembly 38 includes backrest 42 configured to be maneuvered from a substantially vertical position to a substantially horizontal position with respect to seat 40. Backrest 42 includes lower portion 42B configured to pivot about a second axis from a first position to a second position, and upper, removable portion 42A configured to pivot about a third axis from a third position to a fourth position.

Figure 17A:
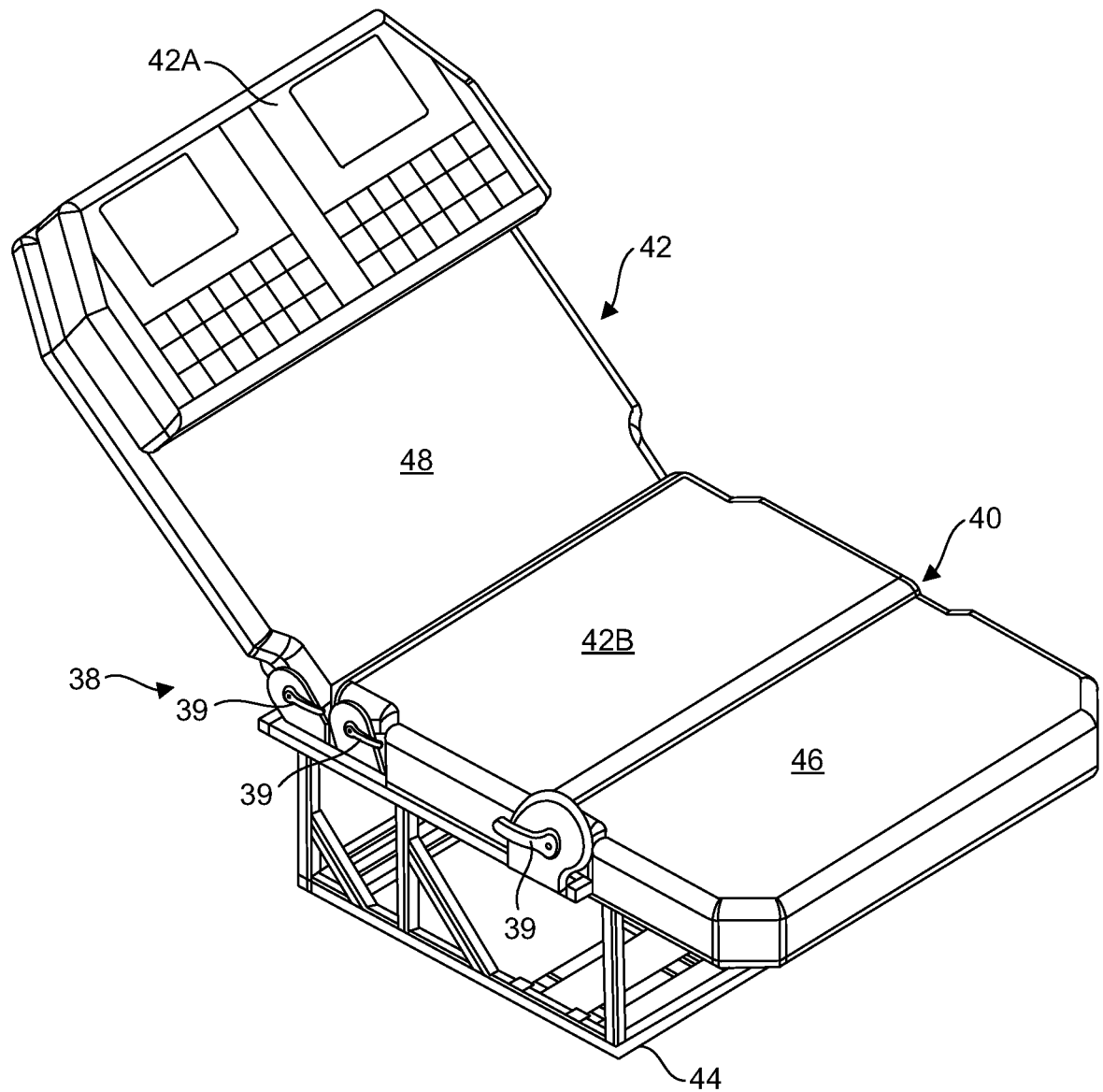
FIG. 17A is a perspective view of the seat/bed conversion assembly portion of the RV retrofit system of the present disclosure in a lounge configuration.

FIG. 17A shows assembly 38 in yet another configuration. Here, in a lounge configuration, upper portion 42A of backrest 42 is used as a headrest and assembly 38 is angled in a partially reclined position.

Figure 17B:
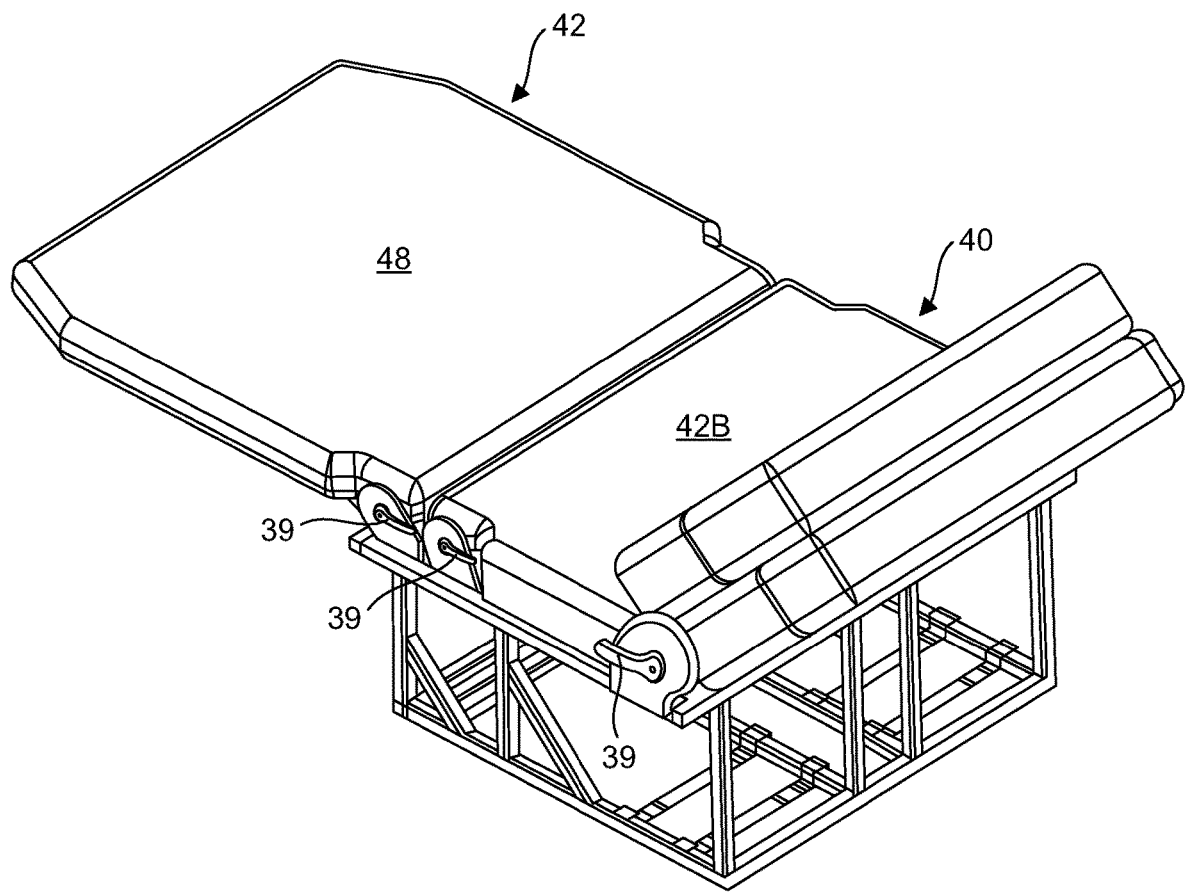
FIG. 17B is a perspective view of the seat/bed conversion assembly portion of the RV retrofit system of the present disclosure in another lounge configuration.

In FIG. 17B, another embodiment of the lounge configuration of FIG. 17A is shown. Here, backrest 42 is in a fully reclined position with upper portion 42A fully extended and the lower section of seat 42 is raised to an angled position.

Figure 18A:
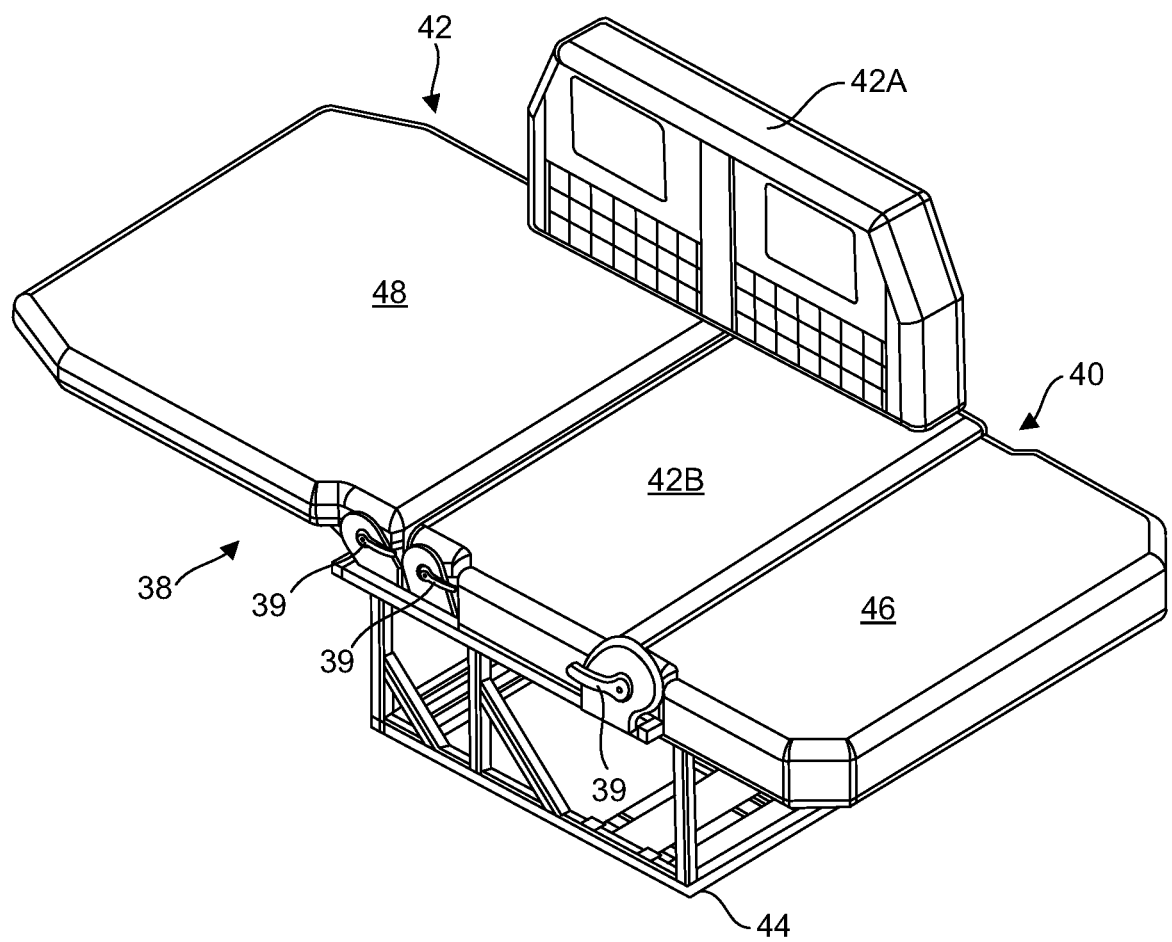
FIG. 18A is a perspective view of the seat/bed conversion assembly portion of the RV retrofit system of the present disclosure in a sofa configuration.

FIG. 18A shows assembly 38 in a sofa configuration. Here, upper portion 42A has been moved to act as a head rest or pillow along the substantial midpoint of assembly 38. In this embodiment, upper portion 42A spans a portion of both exposed surface 48 and lower portion 42B. Thus, for example, a user, can use upper portion 42A as a pillow and position themselves as if laying on a sofa, e.g., resting cross-ways rather than lengthwise on assembly 38. Assembly 38 can be positioned within the interior of the vehicle such that the interior wall of the vehicle would support upper portion 42A when a user lays thereon. Upper portion 42A can be moved to any location along the edge of assembly 38, as shown in the ensuing figures.

Figure 18B:
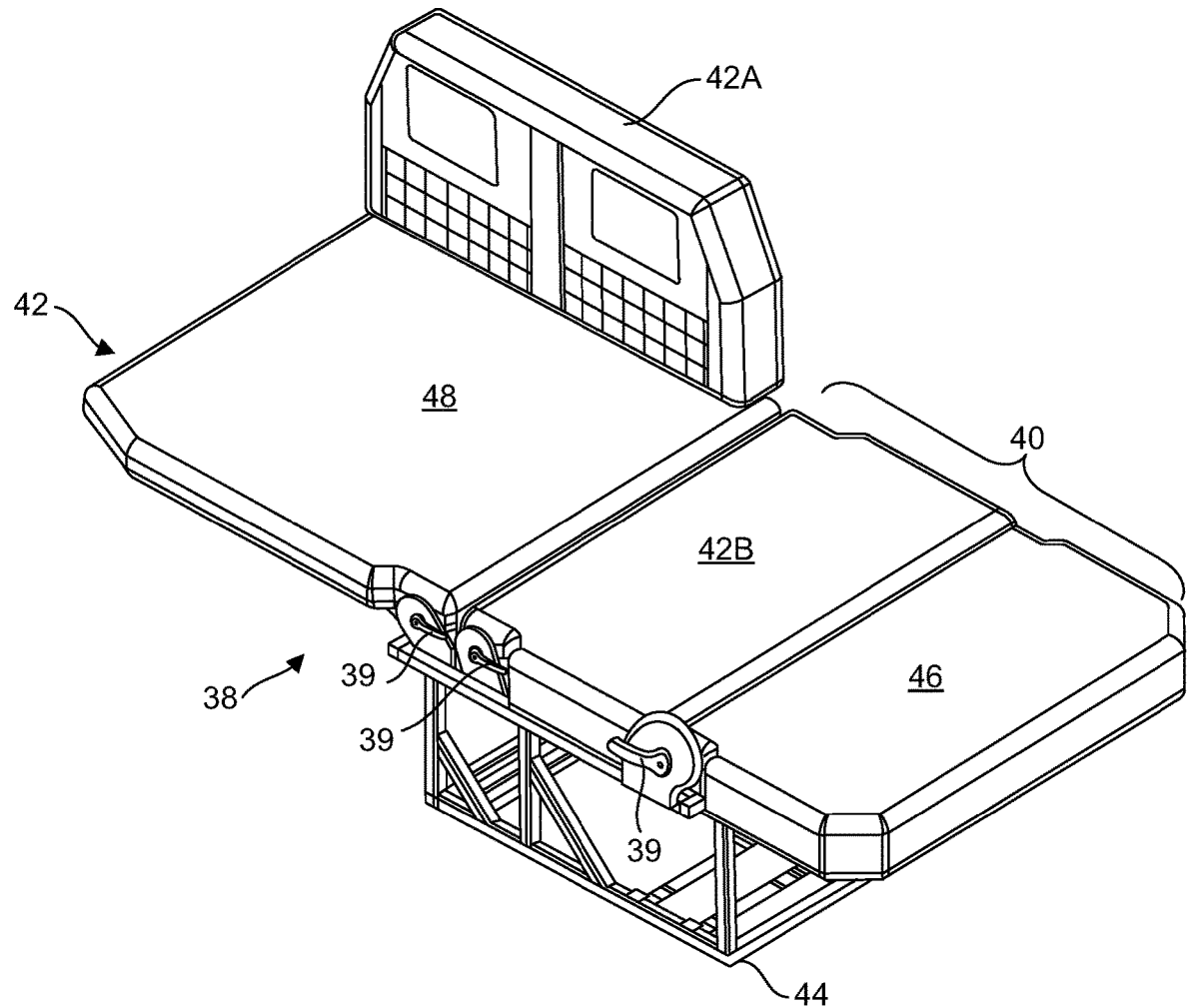
FIG. 18B is a perspective view of the seat/bed conversion assembly portion of the RV retrofit system of the present disclosure in another sofa configuration.

For example, in FIG. 18B shows a similar configuration of assembly 38 as that shown in FIG. 18A except that upper portion 42A is moved along the side of exposed surface 48.

Figure 18C:
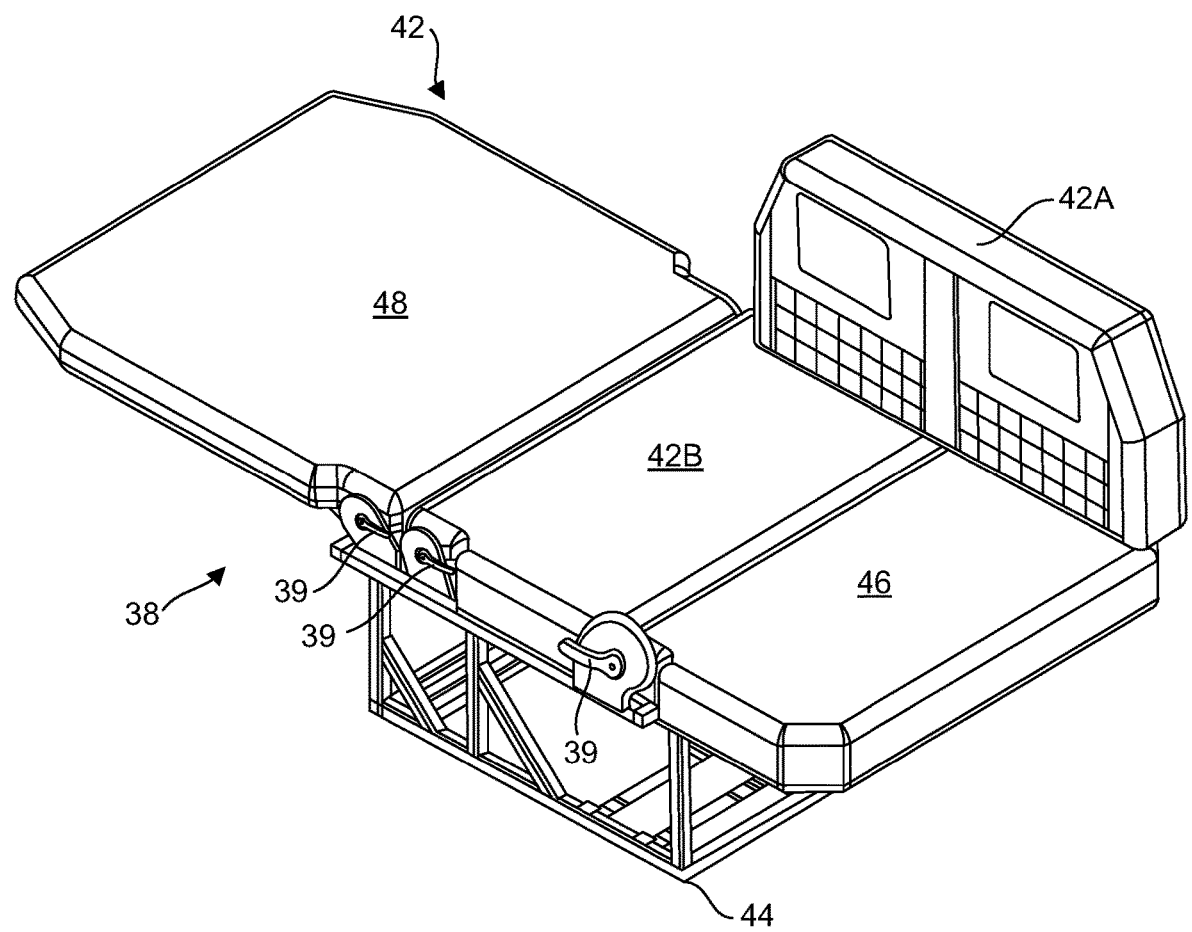
FIG. 18C is a perspective view of the seat/bed conversion assembly portion of the RV retrofit system of the present disclosure in yet another sofa configuration.

In FIG. 18C, upper portion 42A is moved to span a portion of lower portion 42B and underside 46 of seat 40. Thus, FIGS. 18A-18C show how assembly 38 can be used as a sofa by using upper portion 42A in various locations to allow a person to sit or rest crossways across assembly 38, using upper portion 42A as a head rest or pillow, all within the interior of a vehicle.

Figure 18D:
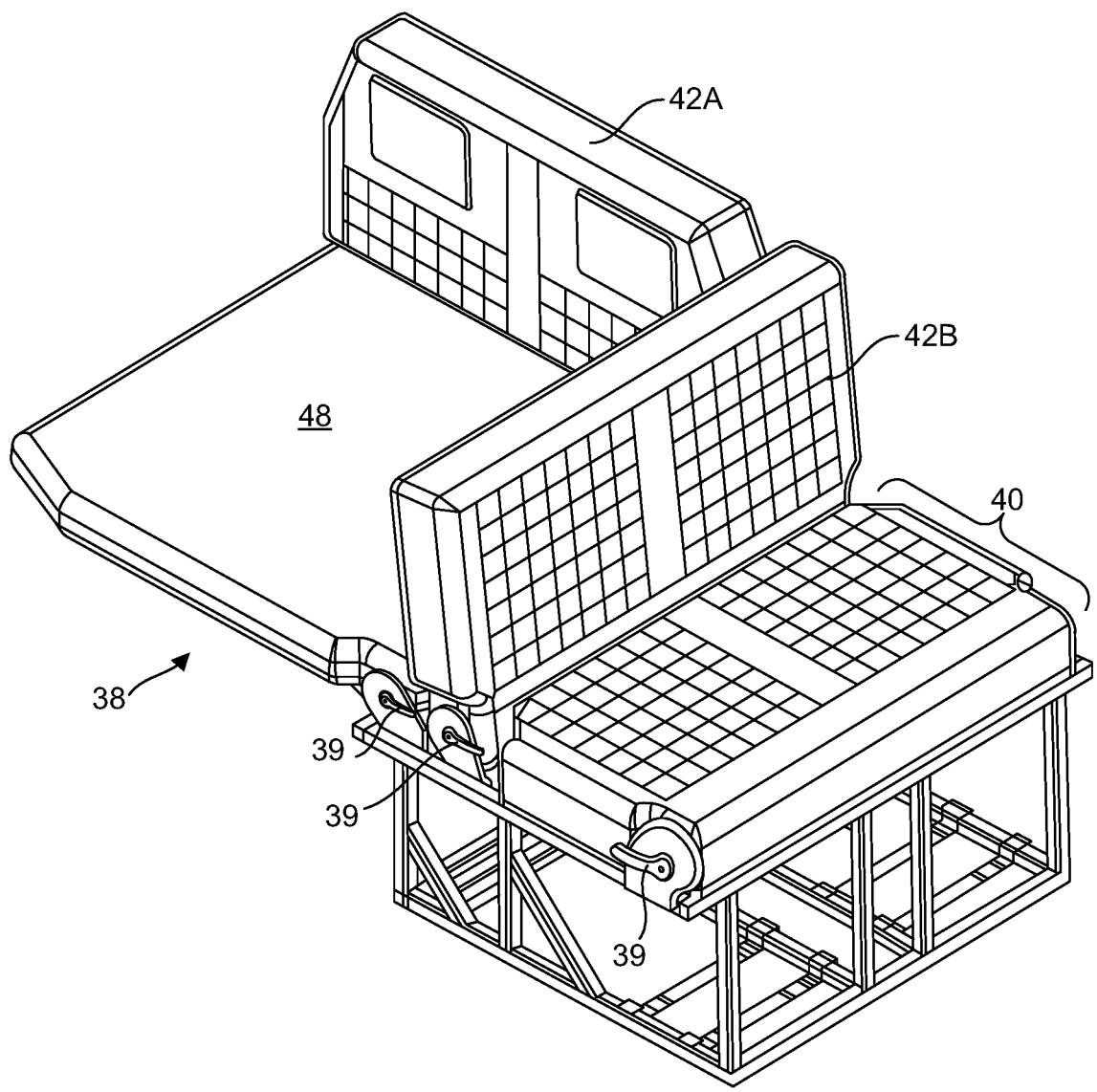
FIG. 18D is a perspective view of the seat/bed conversion assembly portion of the RV retrofit system of the present disclosure an still yet another sofa configuration.

FIG. 18D illustrates yet another configuration of assembly 38. Here, exposed surface 48 and upper portion 42A form one seating area while seat 40 and lower portion 42B form a second seating area.

The different configurations shown in FIGS. 16A through 18D are exemplary only, and assembly 38 and its various components can be maneuvered such that many different sitting/resting/sleeping configurations can be created.

Disclosed herein is an RV retrofit system that allows the interior space of a vehicle such as an RV, to be properly utilized. The present disclosure provide a plurality of deployable assemblies, for example, a privacy curtain/shower assembly, a foldable counter assembly, and a multi-functional seat/bed conversion assembly, each capable of being deployed and used within the interior of the RV and, when not in use, stored in such a manner that the interior space of the RV is properly utilized.

A plurality of assemblies that can be deployed in an economical manner within the limited interior space of a recreational vehicle is provided. The modules can be stored, when not in use, in such a way, that the interior of the vehicle is not cluttered. For example, a deployable privacy curtain assembly includes an upper storage receptacle attachable to a surface in an interior of a vehicle, the upper storage receptacle configured to retain a foldable privacy curtain in a first non-deployed configuration, the privacy curtain extendable towards a bottom surface of the interior of the vehicle in a second deployed configuration.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A modular seat/bed conversion assembly for use within the interior of a recreational vehicle, the seat/bed conversion assembly comprising:
   a substantially horizontal seat configured to pivot forward substantially 180 degrees about a first axis;
   a backrest configured to be maneuvered between a substantially vertical position to a substantially horizontal position and at least one of a plurality of positions in between with respect to the seat, the backrest comprising:
      a lower portion configured to pivot in a first direction about a second axis from a first position to a second position and while in the second position the lower portion is flush with and forms an extended substantially horizontal seating surface with the pivoted seat; and
      an upper portion configured to pivot substantially 180 degrees in a second direction opposite the first direction about a third axis from a third position to a fourth position.

2. The modular seat/bed conversion assembly of claim 1, wherein the upper portion of the backrest is removable.

3. The modular seat/bed conversion assembly of claim 2, wherein the removable upper portion of the backrest can be placed lengthwise across the assembly resulting in a sofa configuration.

4. The modular seat/bed conversion assembly of claim 1, wherein the upper portion of the backrest, when in the third position, may be used as a pillow to support a user's head or upper body.

5. The modular seat/bed conversion assembly of claim 1, wherein when the seat is pivoted forward substantially 180 degrees, when the lower portion of the backrest is pivoted to the second position, when the upper portion of the backrest is rotated to the fourth position, and when the backrest is in the substantially horizontal position, the backrest and the seat are substantially coplanar thus forming an elongated sleeping surface.

6. A method of converting a seat assembly to a bed assembly for use within the interior of a recreational vehicle, the seat assembly comprising a seat portion and a backrest portion, the backrest portion including a lower portion and an upper portion, the method comprising:
   pivoting the seat portion forward substantially 180 degrees around a first axis until it forms a partial seating surface;
   pivoting the lower portion of the backrest portion in a first direction about a second axis from a first position to a second position and while in the second position the lower portion is flush with and forms an extended seating surface with the pivoted seat;
   pivoting the upper portion of the backrest portion substantially 180 degrees in a second direction opposite the first direction about a third axis from a third position to a fourth position; and
   maneuvering the backrest portion to a substantially horizontal position, wherein the backrest portion and the extended seating surface are substantially coplanar thus forming an elongated sleeping surface.

\* \* \* \* \*